Sept. 25, 1962  R. A. DAVIS  3,055,586
DIGIT-BY-DIGIT DECIMAL CORE MATRIX MULTIPLIER
Filed Nov. 12, 1958  32 Sheets-Sheet 1

DIGIT BY DIGIT DECIMAL
CORE MATRIX MULTIPLIER
SAMPLE MULTIPLICATION

*Fig. 1.*

| STEP NO | SELECTED POSITION | |
|---|---|---|
| | MP | MC |
| 1 | 1 | 1 |
| 2 | 1 | 2 |
| 3 | 2 | 1 |
| 4 | 1 | 3 |
| 5 | 2 | 2 |
| 6 | 3 | 1 |
| 7 | 1 | 4 |
| 8 | 2 | 3 |
| 9 | 3 | 2 |
| 10 | 4 | 1 |
| 11 | 1 | 5 |
| 12 | 2 | 4 |
| 13 | 3 | 3 |
| 14 | 4 | 2 |
| 15 | 5 | 1 |
| 16 | 1 | 6 |
| 17 | 2 | 5 |
| 18 | 3 | 4 |
| 19 | 4 | 3 |
| 20 | 5 | 2 |
| 21 | 6 | 1 |
| 22 | 2 | 6 |
| 23 | 3 | 5 |
| 24 | 4 | 4 |
| 25 | 5 | 3 |
| 26 | 6 | 2 |
| 27 | 3 | 6 |
| 28 | 4 | 5 |
| 29 | 5 | 4 |
| 30 | 6 | 3 |
| 31 | 4 | 6 |
| 32 | 5 | 5 |
| 33 | 6 | 4 |
| 34 | 5 | 6 |
| 35 | 6 | 5 |
| 36 | 6 | 6 |

PARTIAL PRODUCTS
MULTIPLICAND 9 8 7 6 5 4
MULTIPLIER 1 2 3 4 5 6

DEVELOPED PRODUCT

INVENTOR
*Roderic A. Davis*
BY *Sughrue & Rothwell*
ATTORNEYS

Sept. 25, 1962   R. A. DAVIS   3,055,586
DIGIT-BY-DIGIT DECIMAL CORE MATRIX MULTIPLIER
Filed Nov. 12, 1958   32 Sheets-Sheet 2

INVENTOR
Roderic A. Davis
BY Sughrue & Rothwell
ATTORNEYS

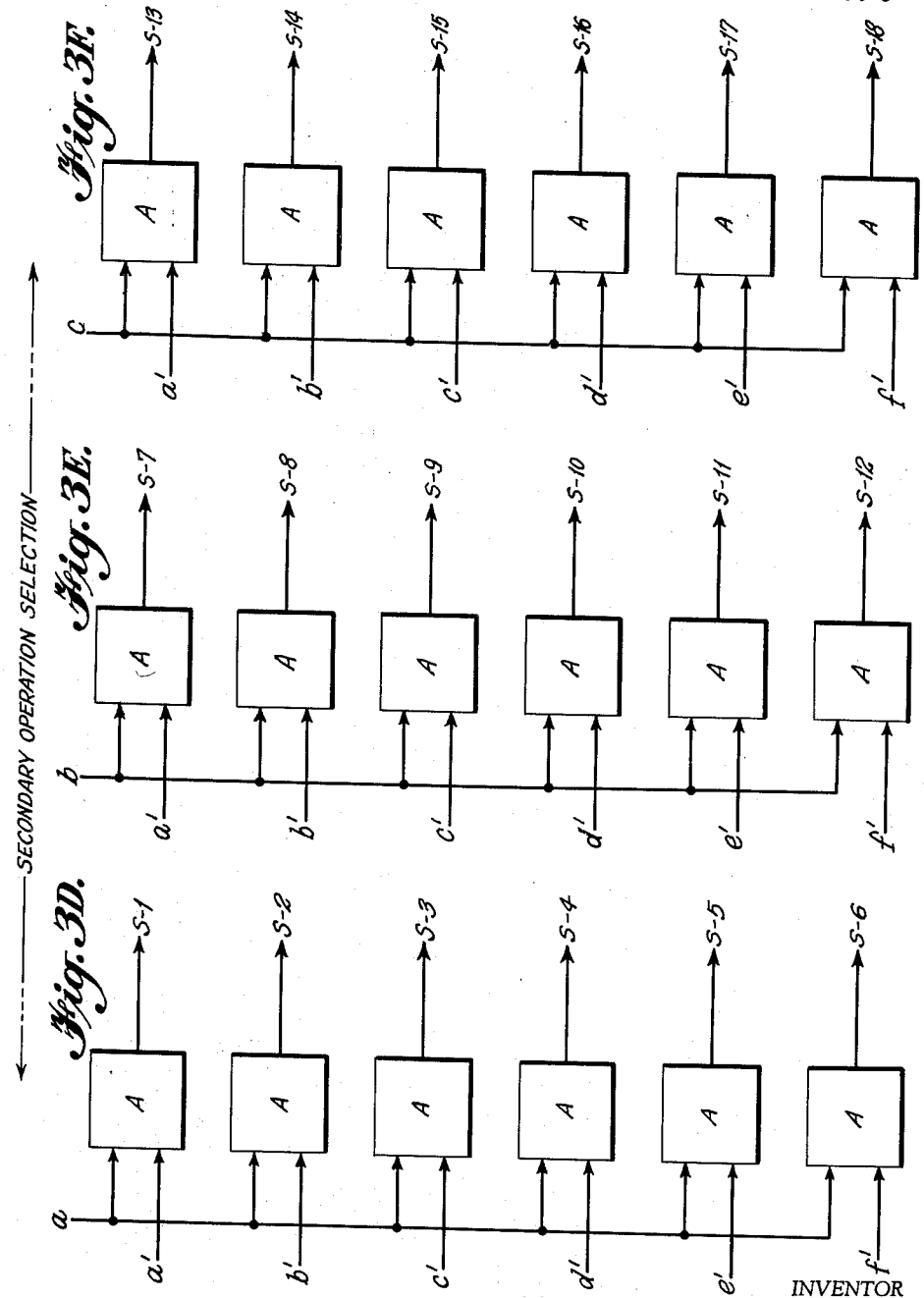

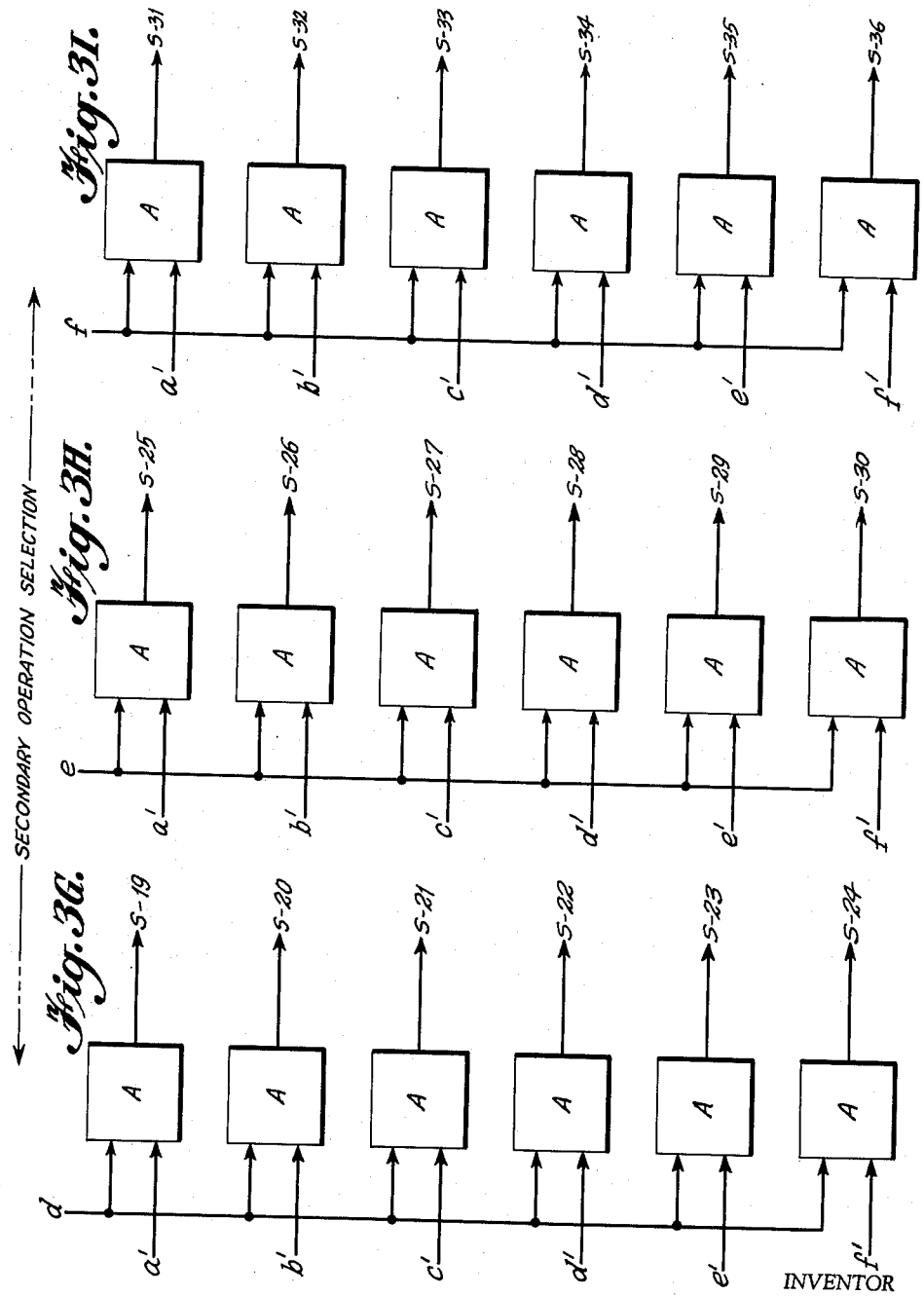

Sept. 25, 1962 R. A. DAVIS 3,055,586
DIGIT-BY-DIGIT DECIMAL CORE MATRIX MULTIPLIER
Filed Nov. 12, 1958 32 Sheets—Sheet 7
*Fig. 3J.*
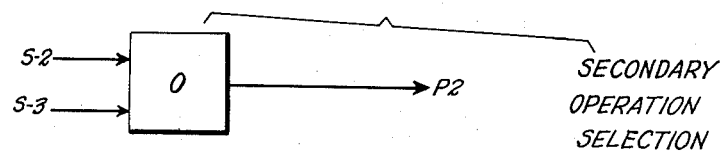
SECONDARY OPERATION SELECTION
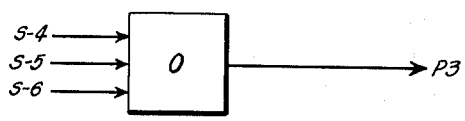
*Fig. 3K.*
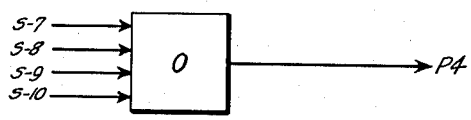
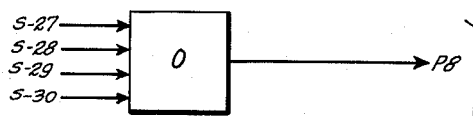
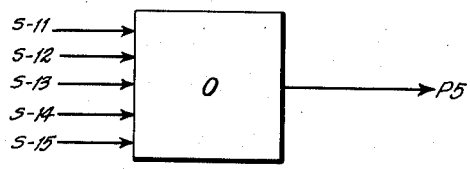
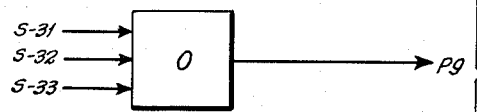
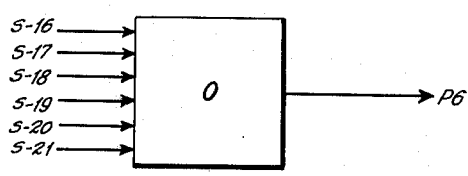
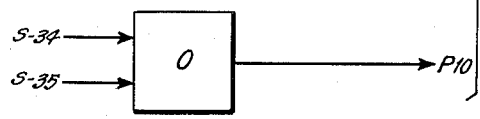
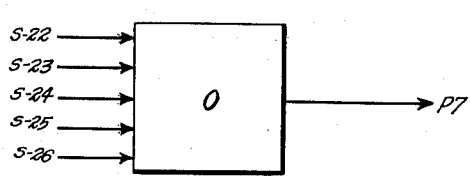
INVENTOR
Roderic A. Davis
BY Sughrue & Rothwell
ATTORNEYS Sept. 25, 1962  R. A. DAVIS  3,055,586
DIGIT-BY-DIGIT DECIMAL CORE MATRIX MULTIPLIER
Filed Nov. 12, 1958  32 Sheets-Sheet 9

INVENTOR
Roderic A. Davis

BY Sughrue & Rothwell
ATTORNEYS

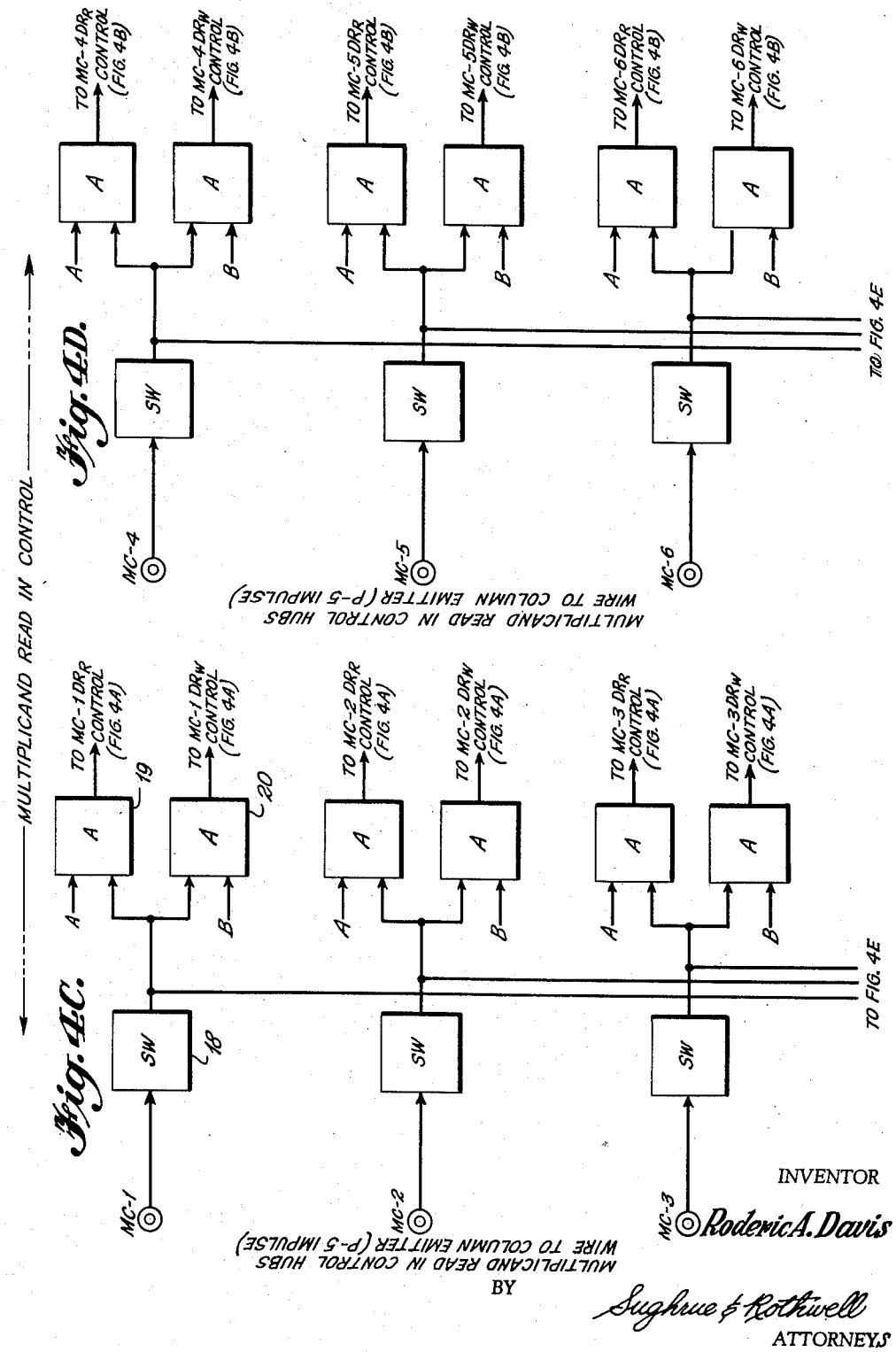

Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 12

INVENTOR
Roderic A. Davis
BY Sughrue & Rothwell
ATTORNEYS

Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 14

INVENTOR
*Roderic A. Davis*
BY *Sughrue & Rothwell*
ATTORNEYS

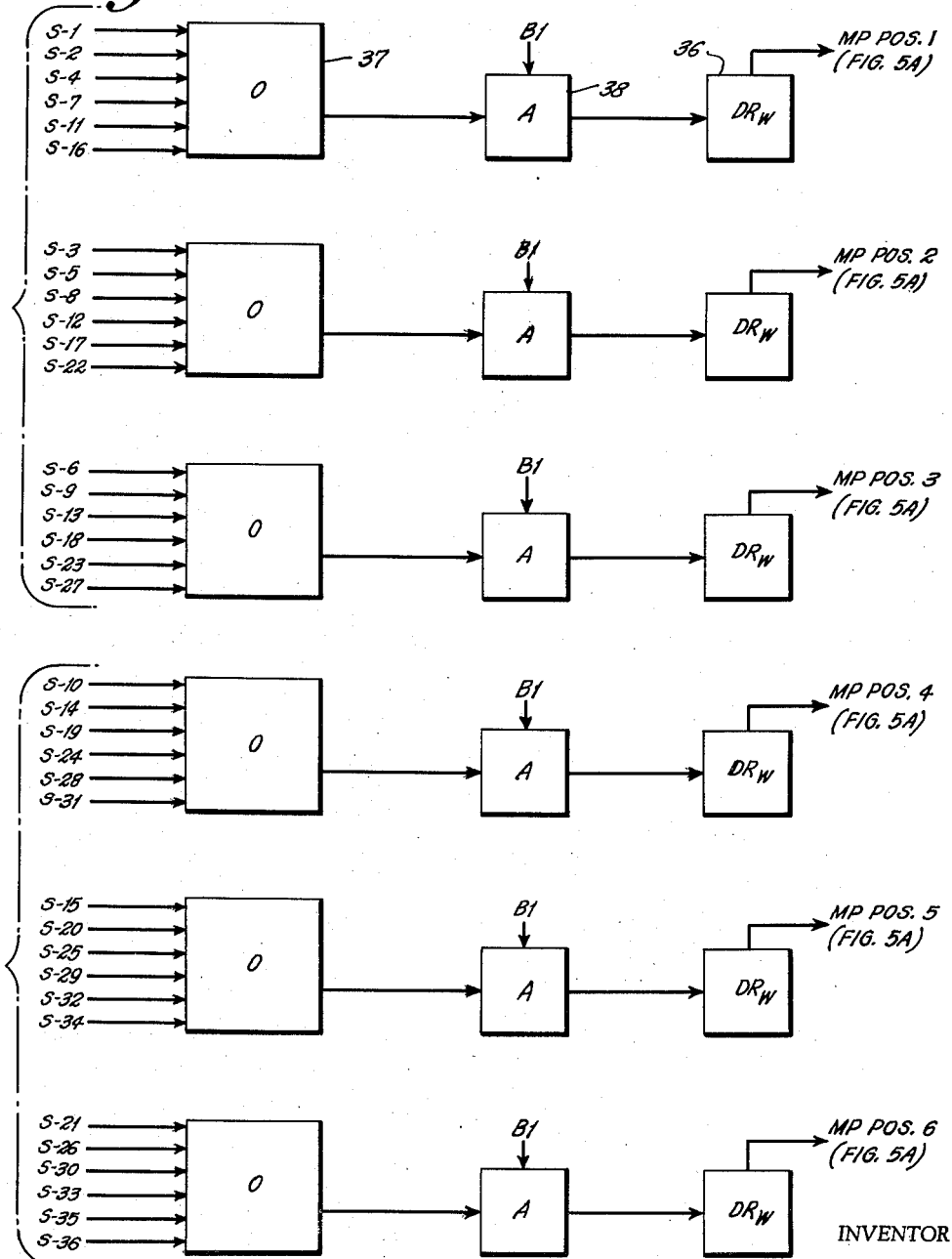

Sept. 25, 1962
R. A. DAVIS
3,055,586
DIGIT-BY-DIGIT DECIMAL CORE MATRIX MULTIPLIER
Filed Nov. 12, 1958
32 Sheets-Sheet 16
Fig. 6.
RH COMPONENTS MULTIPLIER MATRIX
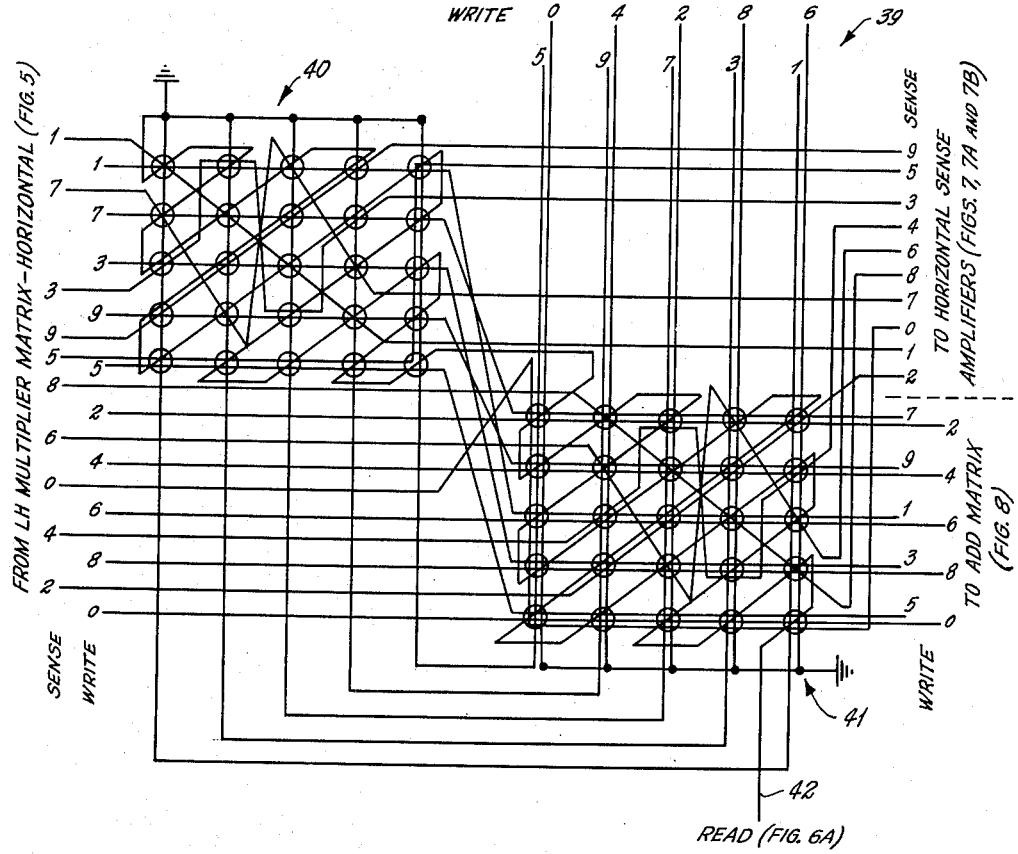
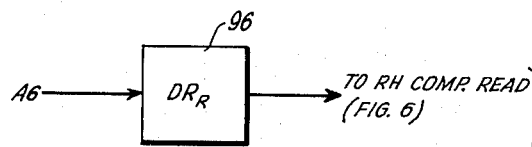
Fig. 6A.
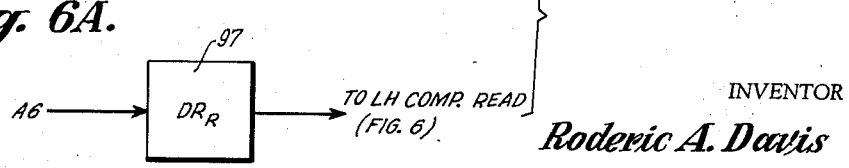
INVENTOR
Roderic A. Davis
BY Sughrue & Rothwell
ATTORNEYS Sept. 25, 1962
R. A. DAVIS
3,055,586
DIGIT-BY-DIGIT DECIMAL CORE MATRIX MULTIPLIER
Filed Nov. 12, 1958
32 Sheets-Sheet 17
Fig. 7.
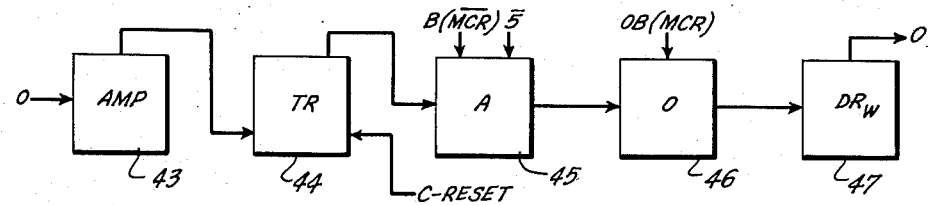
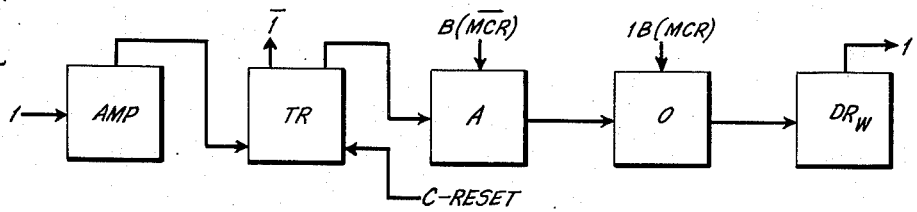
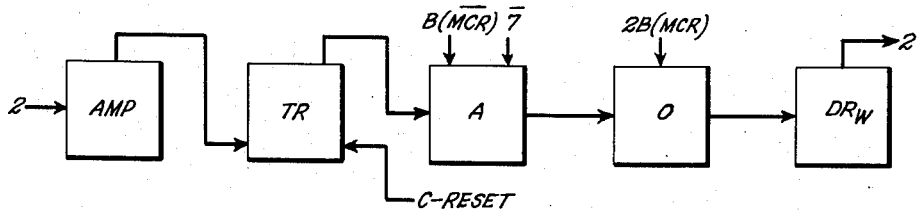
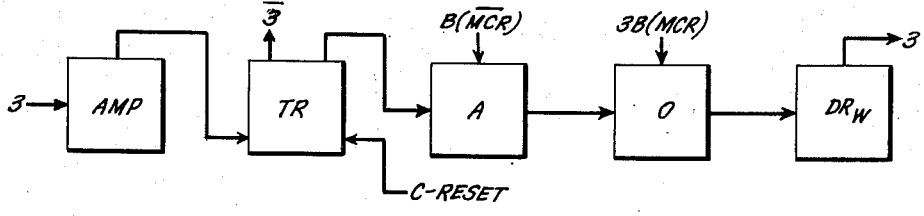
INVENTOR
Roderic A. Davis
BY Sughrue & Rothwell
ATTORNEYS INVENTOR
Roderic A. Davis
BY Sughrue & Rothwell
ATTORNEYS Sept. 25, 1962   R. A. DAVIS   3,055,586
DIGIT-BY-DIGIT DECIMAL CORE MATRIX MULTIPLIER
Filed Nov. 12, 1958   32 Sheets-Sheet 19
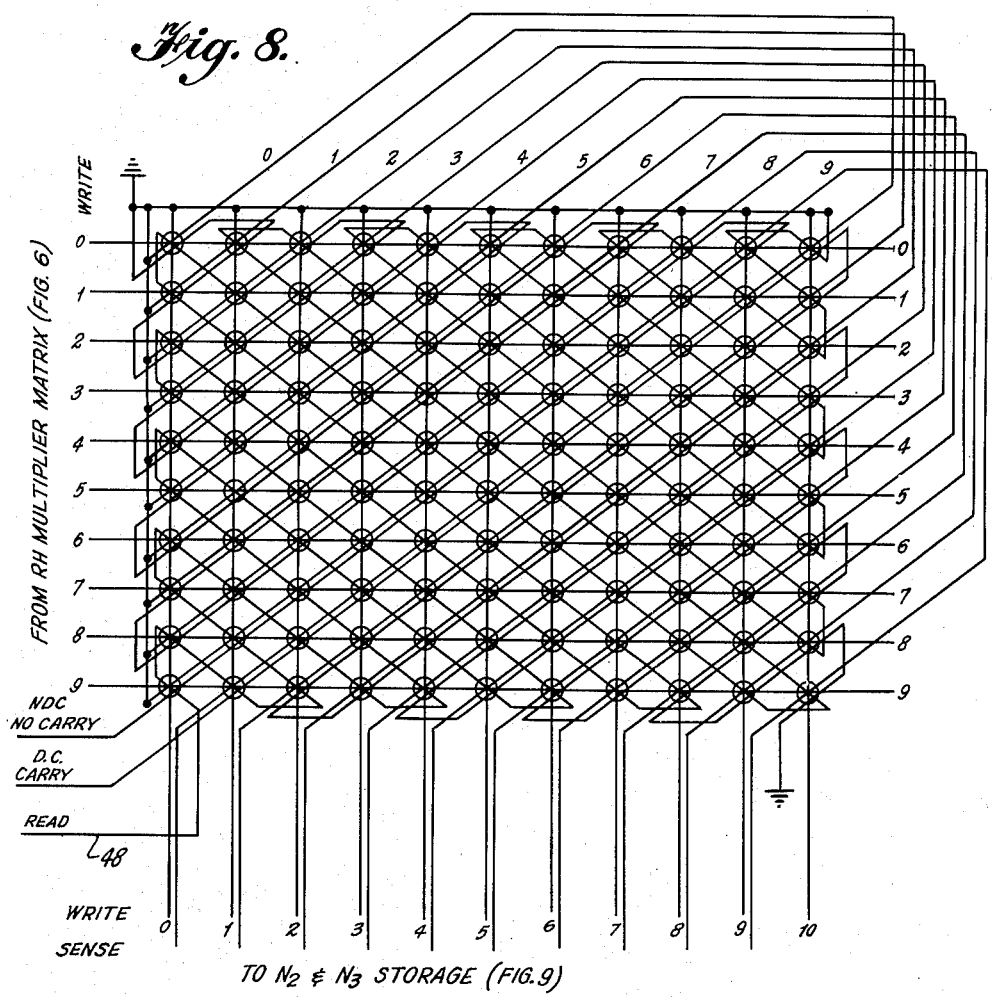
Fig. 8.
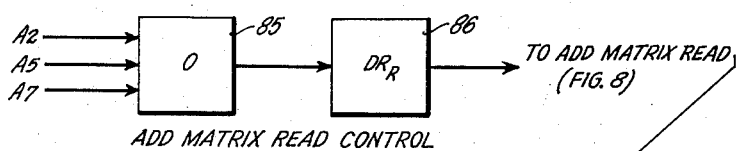
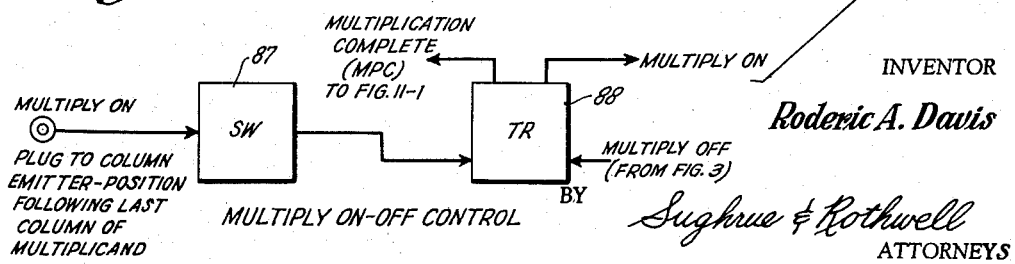
INVENTOR
Roderic A. Davis
Sughrue & Rothwell
ATTORNEYS Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 20

INVENTOR
Roderic A. Davis
BY
Sughrue & Rothwell
ATTORNEYS

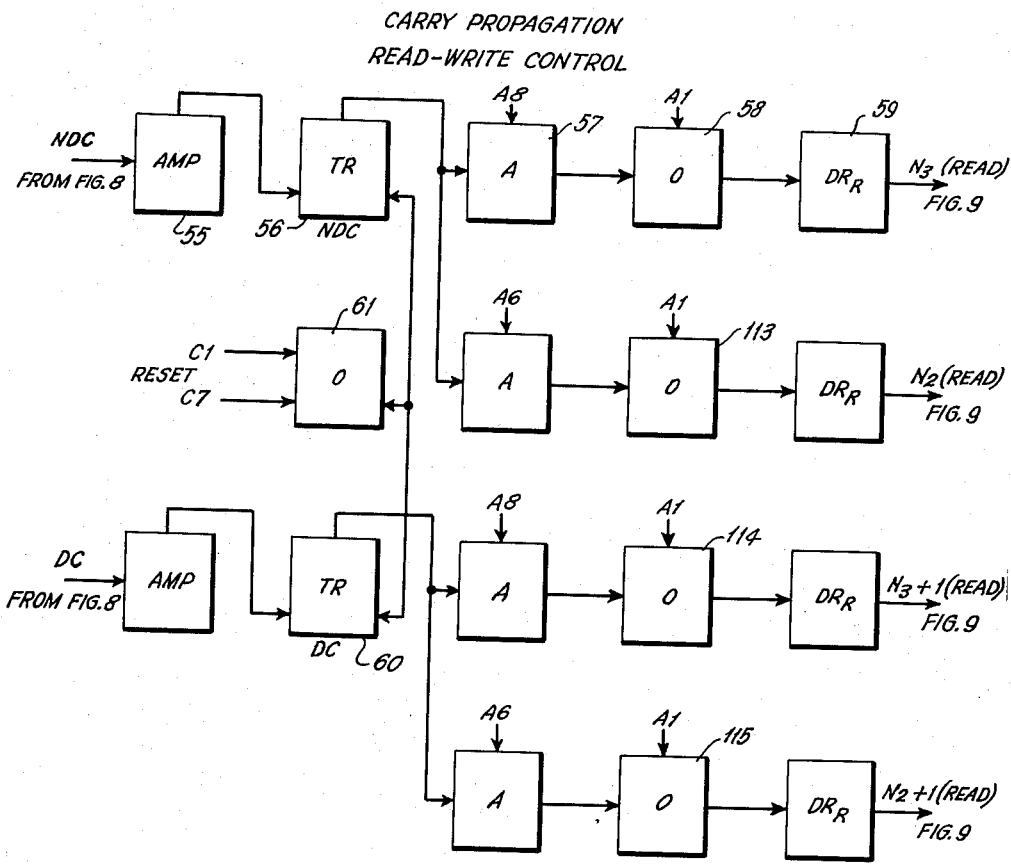

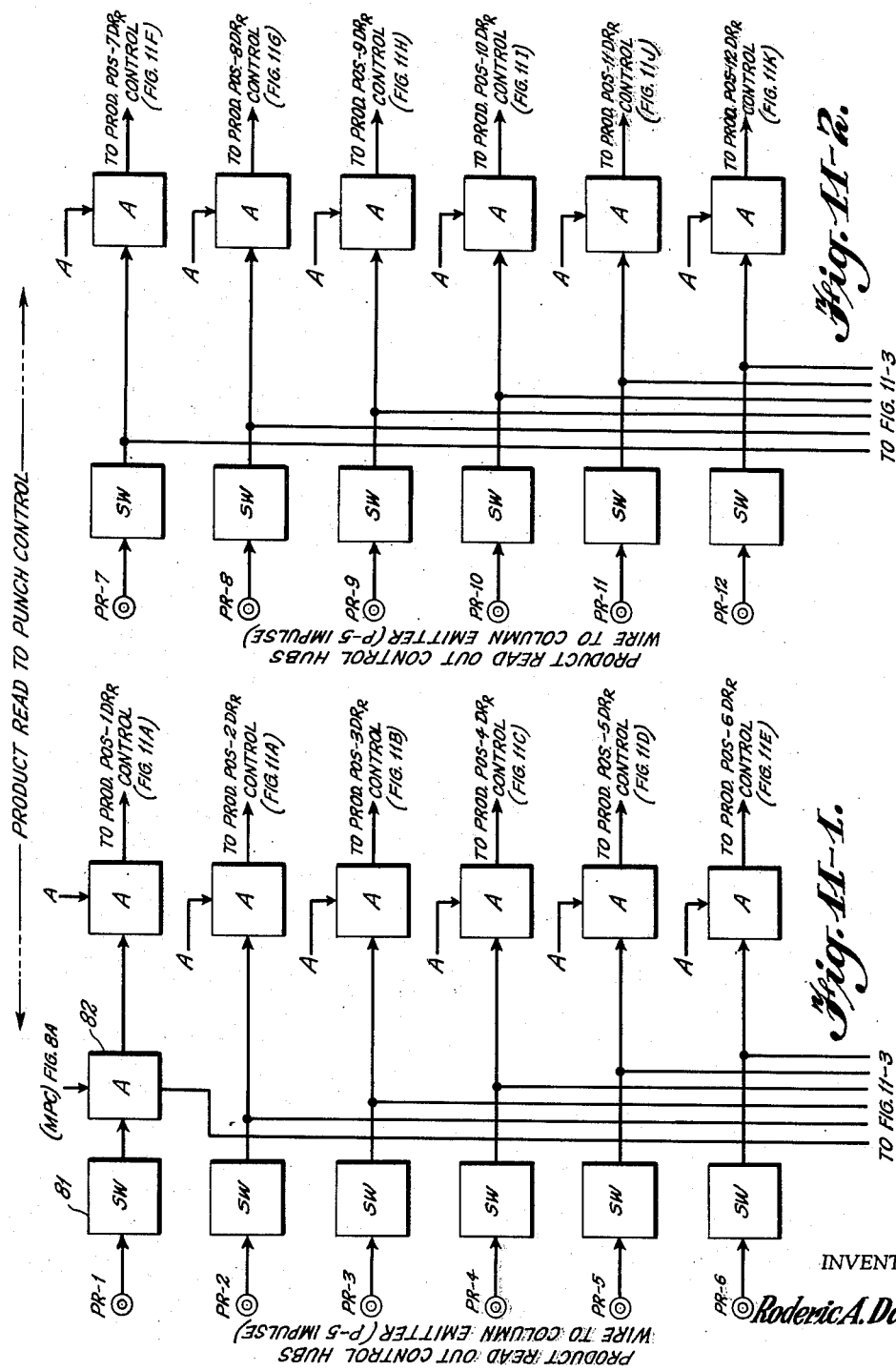

Sept. 25, 1962     R. A. DAVIS     3,055,586
DIGIT-BY-DIGIT DECIMAL CORE MATRIX MULTIPLIER
Filed Nov. 12, 1958     32 Sheets-Sheet 24
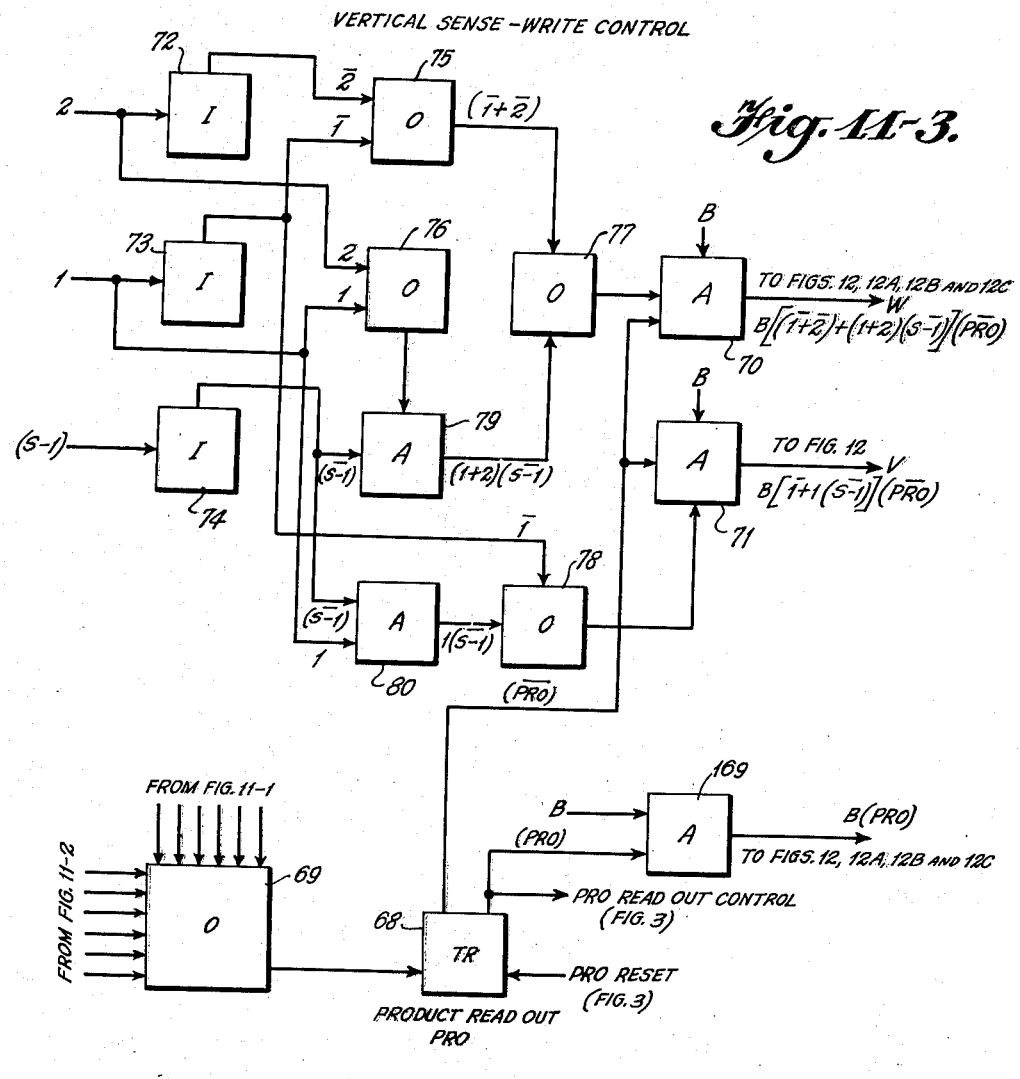
Fig. 11-3.
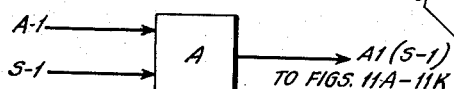
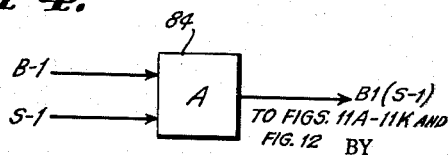
Fig. 11-4.
INVENTOR
Roderic A. Davis
BY
Sughrue & Rothwell
ATTORNEYS INVENTOR
Roderic A. Davis BY Sughrue & Rothwell
ATTORNEYS Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 26
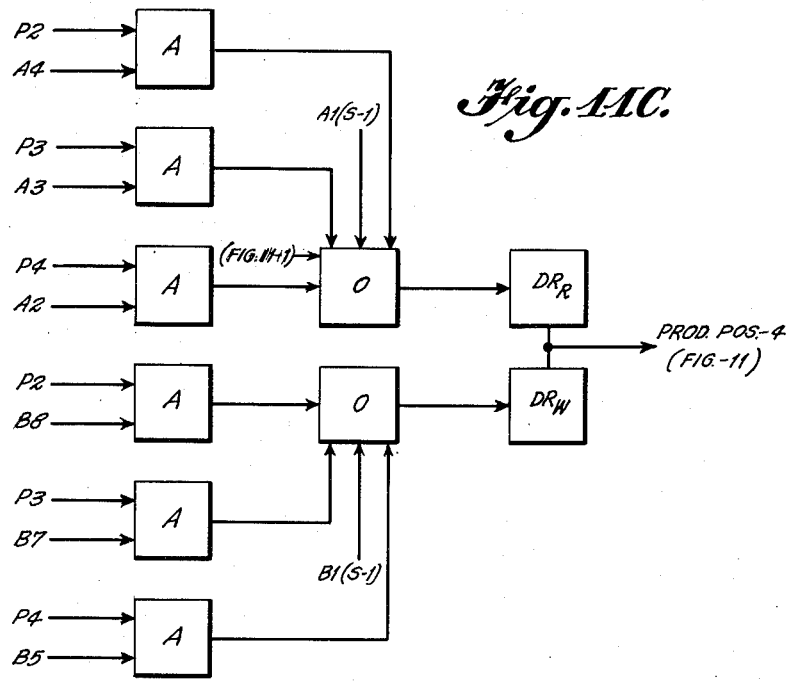
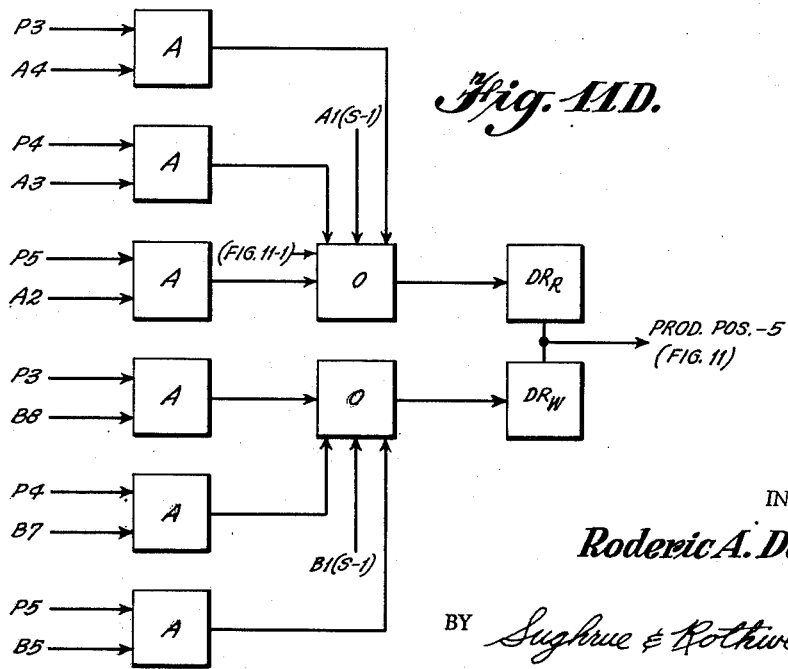
INVENTOR
Roderic A. Davis
BY Sughrue & Rothwell
ATTORNEYS

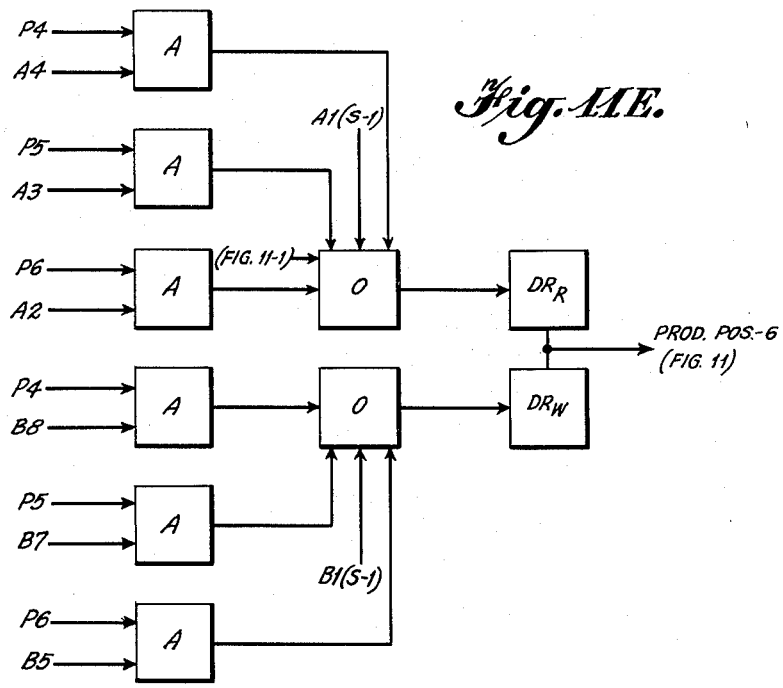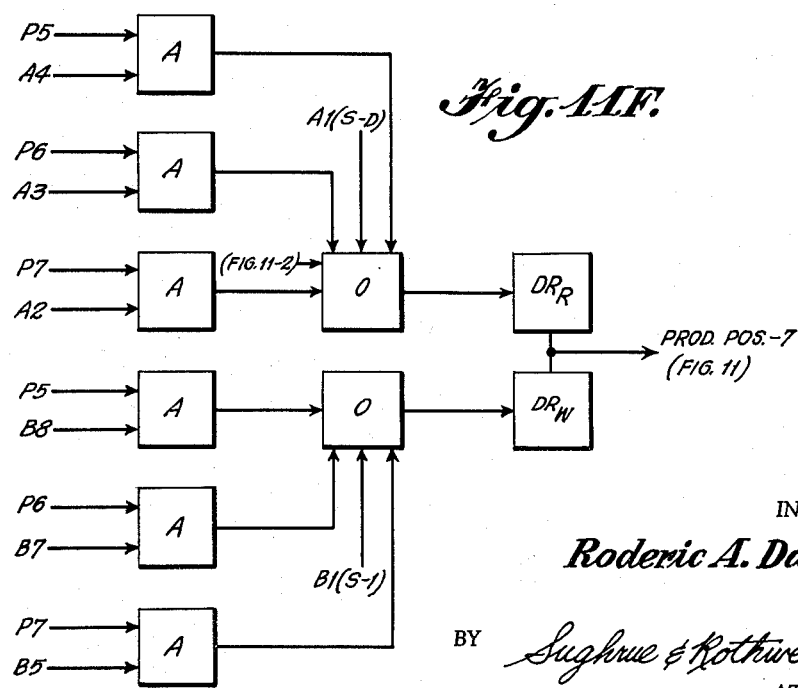

Sept. 25, 1962     R. A. DAVIS     3,055,586
DIGIT-BY-DIGIT DECIMAL CORE MATRIX MULTIPLIER
Filed Nov. 12, 1958     32 Sheets-Sheet 29

PRODUCT STORAGE READ-WRITE

INVENTOR
Roderic A. Davis
BY Sughrue & Rothwell
ATTORNEYS

Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 30
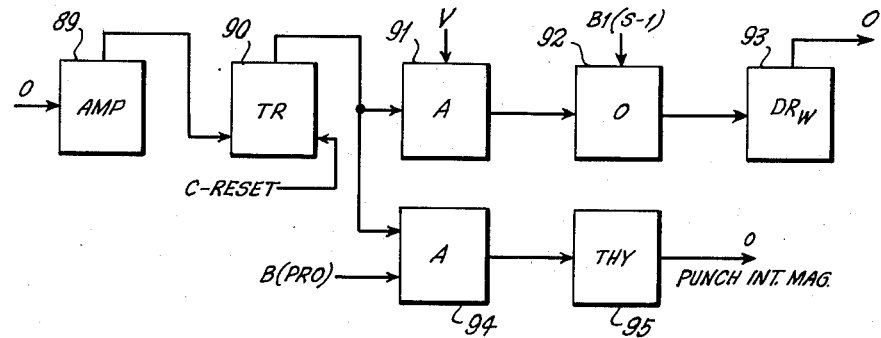
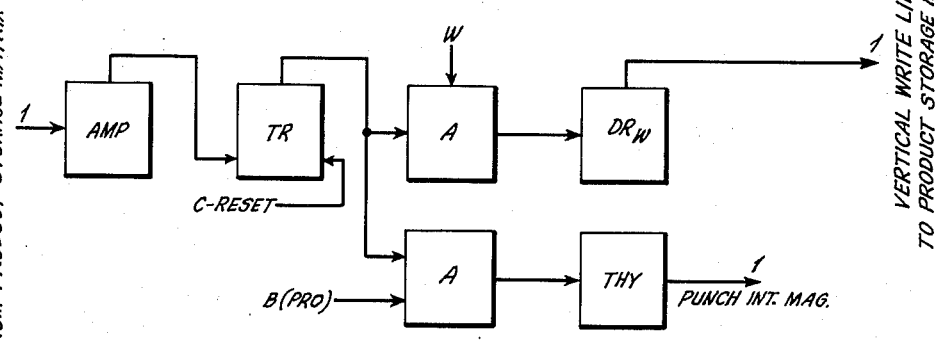
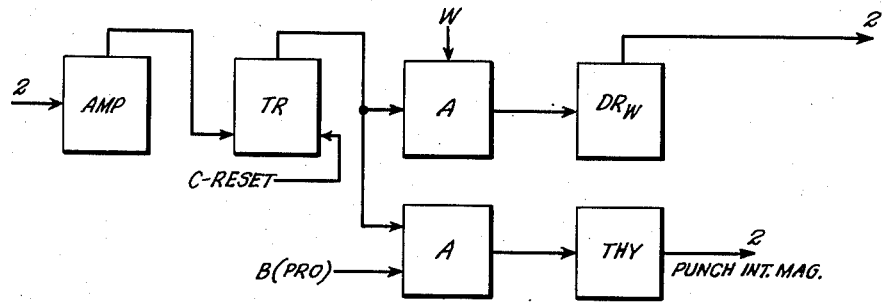
Fig. 12.
INVENTOR
Roderic A. Davis
BY Sughrue & Rothwell
ATTORNEYS Sept. 25, 1962  R. A. DAVIS  3,055,586
DIGIT-BY-DIGIT DECIMAL CORE MATRIX MULTIPLIER
Filed Nov. 12, 1958  32 Sheets-Sheet 31
VERTICAL SENSE-WRITE &
PRODUCT PUNCH
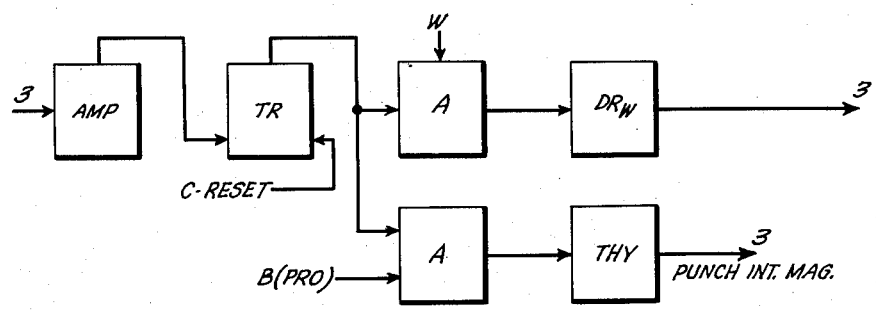
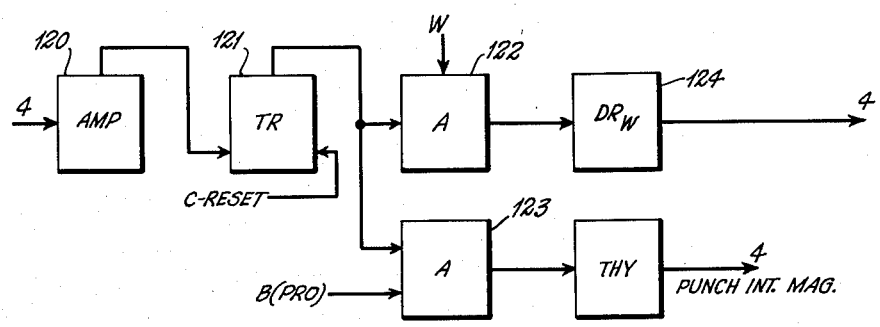
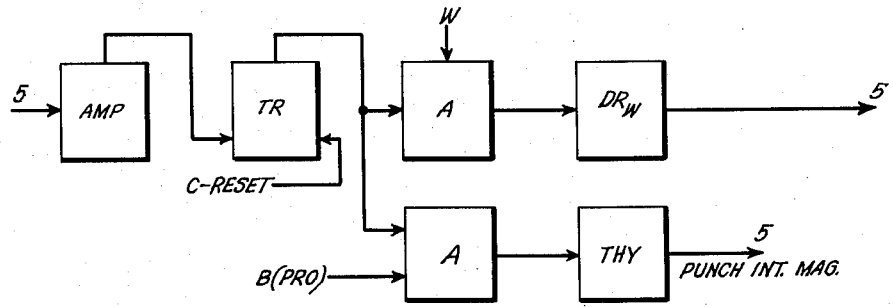
*Fig. 12A.*
INVENTOR
*Roderic A. Davis*
BY *Sughrue & Rothwell*
ATTORNEYS Sept. 25, 1962 R. A. DAVIS 3,055,586
DIGIT-BY-DIGIT DECIMAL CORE MATRIX MULTIPLIER
Filed Nov. 12, 1958 32 Sheets-Sheet 32
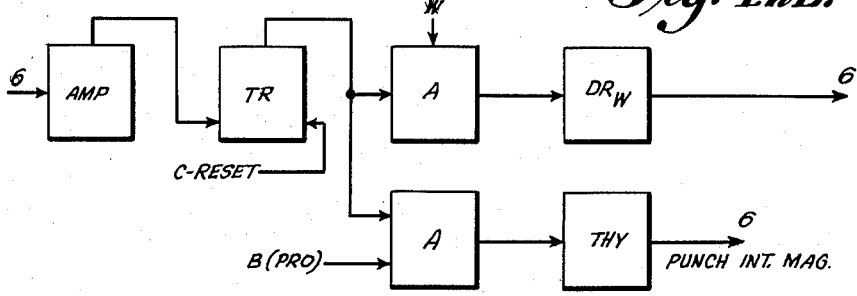
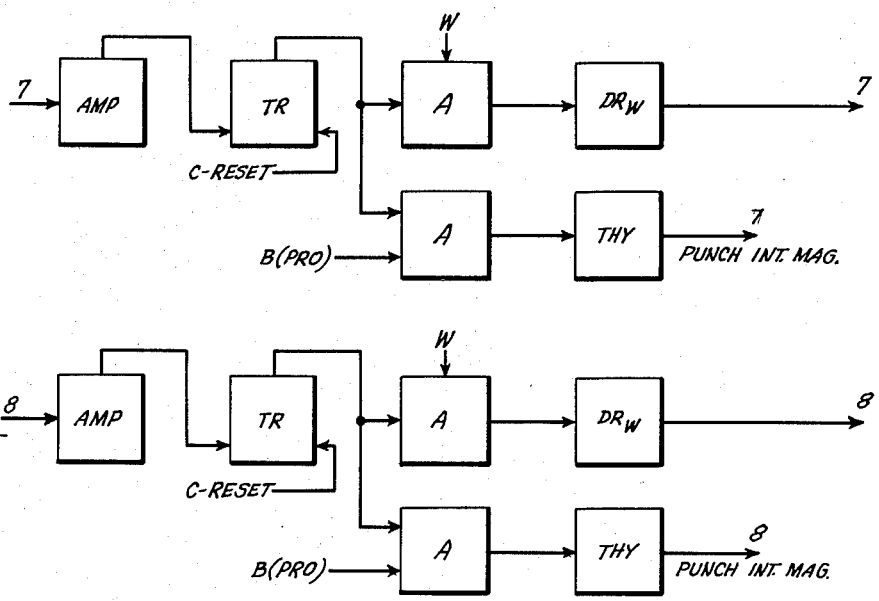
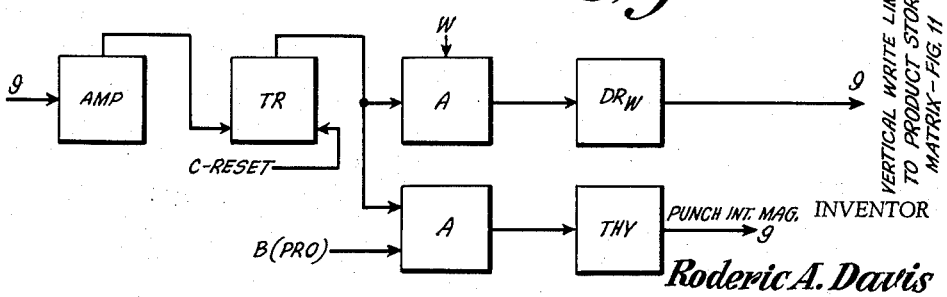
INVENTOR
Roderic A. Davis
BY
Sughrue & Rothwell
ATTORNEYS

United States Patent Office 3,055,586
Patented Sept. 25, 1962

3,055,586
DIGIT-BY-DIGIT DECIMAL CORE MATRIX
MULTIPLIER
Roderic A. Davis, Poughkeepsie, N.Y., assignor to International Business Machines Corporation, New York, N.Y., a corporation of New York
Filed Nov. 12, 1958, Ser. No. 773,249
27 Claims. (Cl. 235—160)

This invention relates to an electronic multiplier and more particularly to a digit-by-digit decimal core matrix multiplier.

In general, decimal multipliers involve accumulation of partial products until all partial products are accumulated thus providing the final product. The addition of partial products involves provision for carry propagation. There may be as many as one less carry orders than there are ordinal positions of the final product. It can be seen then that the multiplication of numbers having a large number of digits to provide a final product having a large number of digits may involve a correspondingly large number of carry orders. This contributes to excessive and complicated circuitry. In particular, it necessitates provision for carry propagation from the least significant ordinal position to the most significant ordinal position of the product.

It is therefore an object of this invention to provide a decimal multiplier having a minimum number of carry orders whereby the complexity and amount of circuitry necessary to accomplish the multiplication is materially reduced with all advantages attendant thereon.

It is a further object of this invention to provide a decimal multiplier for development of the final product from right to left (least to most significant ordinal position) in a manner whereby the ordinal positions of the final product are fully developed as soon as possible during the multiplication operation to thereby reduce the number of carry orders necessary.

It is a further object of the invention to provide a decimal multiplier employing digit-by-digit multiplication and providing magnetic core matrices as primary circuit components.

It is another object of the invention to provide a core matrix for determining a dependent variable value, such as that of either component of a partial product, in response to a pair of independent variable values, such as the digits responsible for said partial product, which matrix has a minimum number of cores therein necessary to determine said dependent variable value.

It is a further object of this invention to provide a carry propagation storage device for selectively providing a carry or a no carry order from one ordinal position to the next in which the decimal value of the next ordinal position and said value added to a carry are simultaneously stored in said device for selection by means dependent upon the value of said one ordinal position.

These and other objects will become apparent from a detailed description of the accompanying drawings.

In the drawings:

FIGURE 1 is a view of a chart showing a sample multiplication, the partial products involved and the development of the final product. It also shows the digits of the multiplier and multiplicand which are selected in each one of the 36 steps involved in the multiplication;

Figure 2:
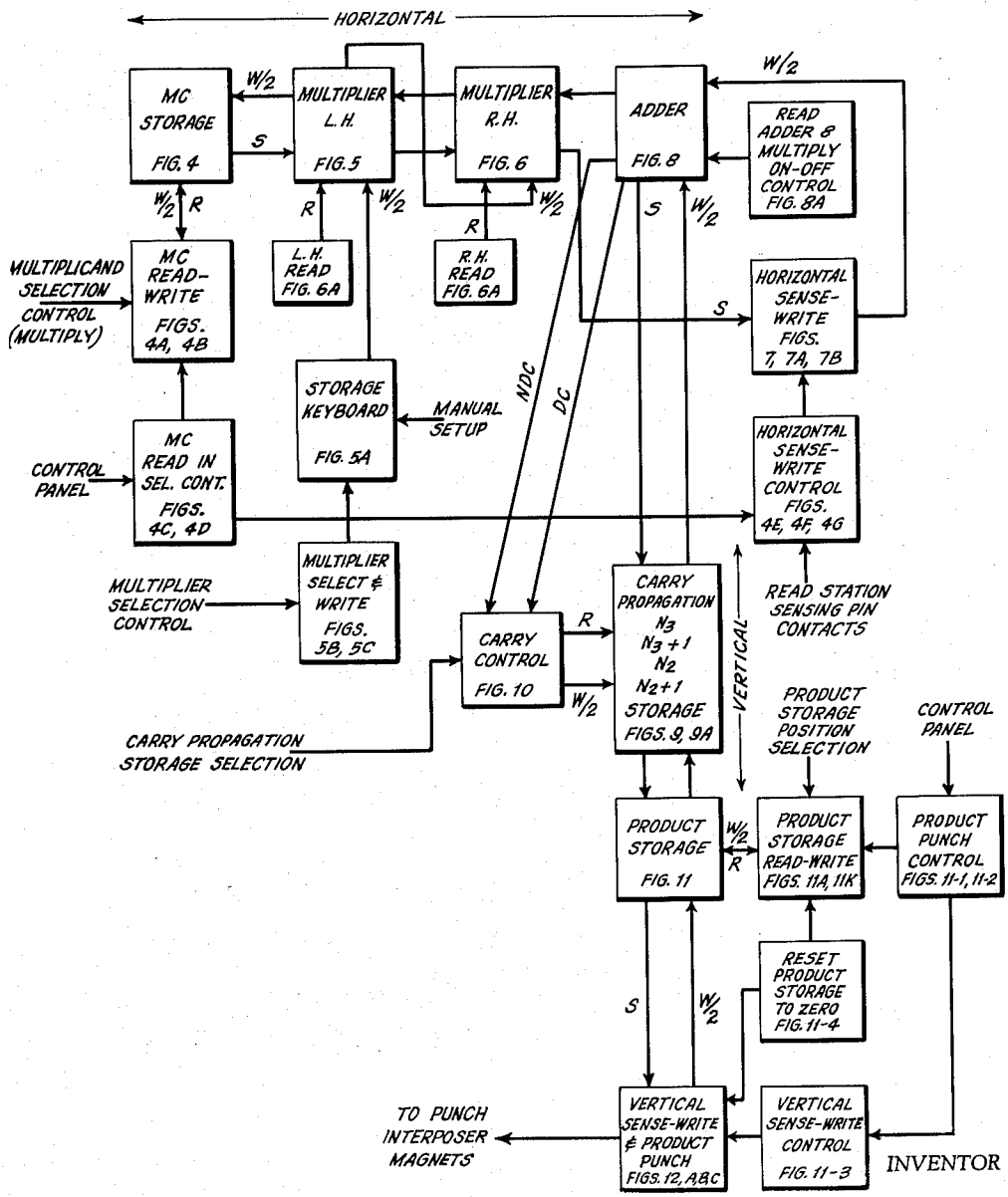
FIGURE 2 is a diagrammatic view showing the general logic of the core matrix multiplier of the present invention and providing a reference to the particular figures in which the details of any particular unit may be found.
Figure 3:
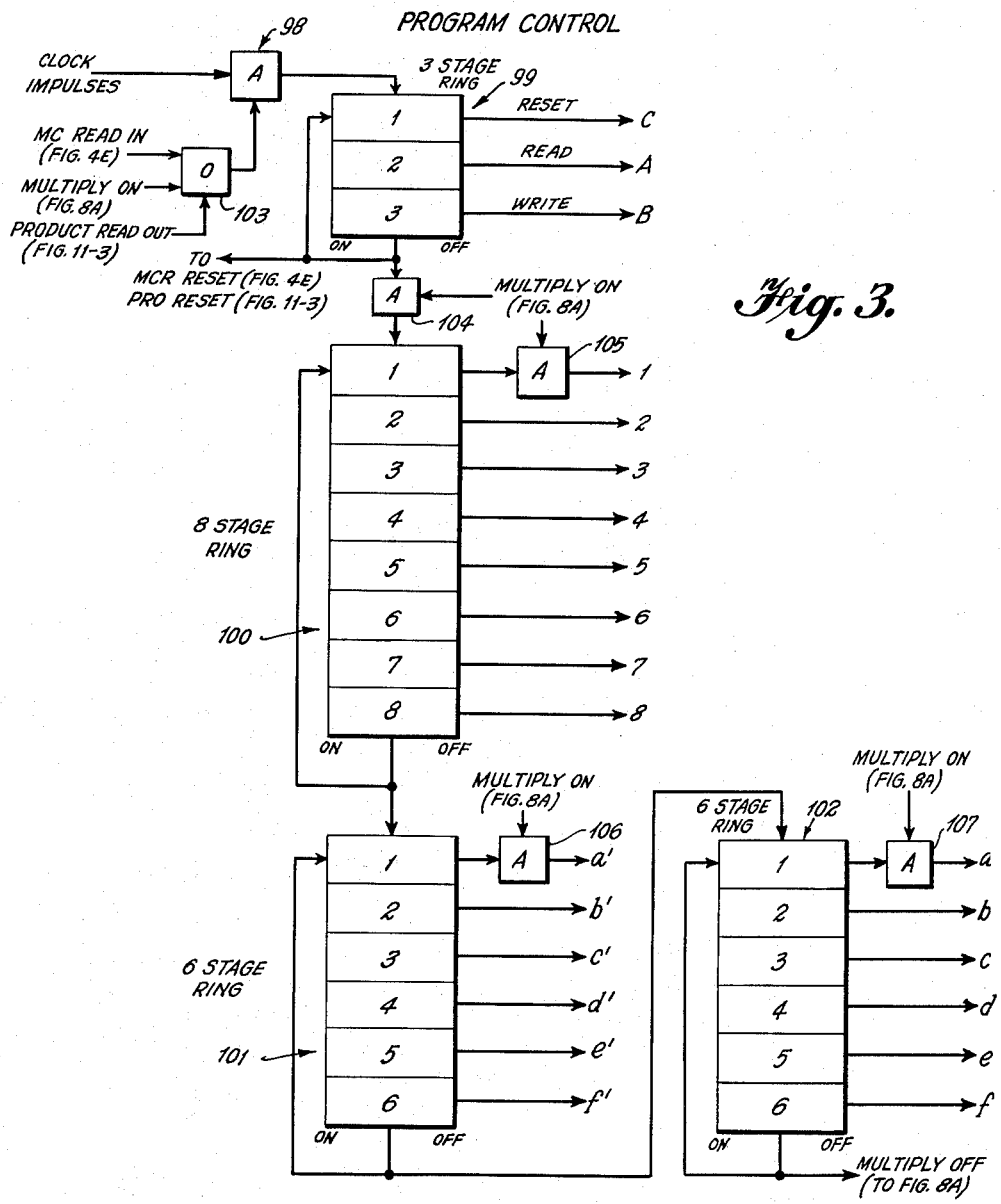
FIGURE 3 is a diagrammatic view showing the means of providing the program control pulses for the present invention.
Figure 4:
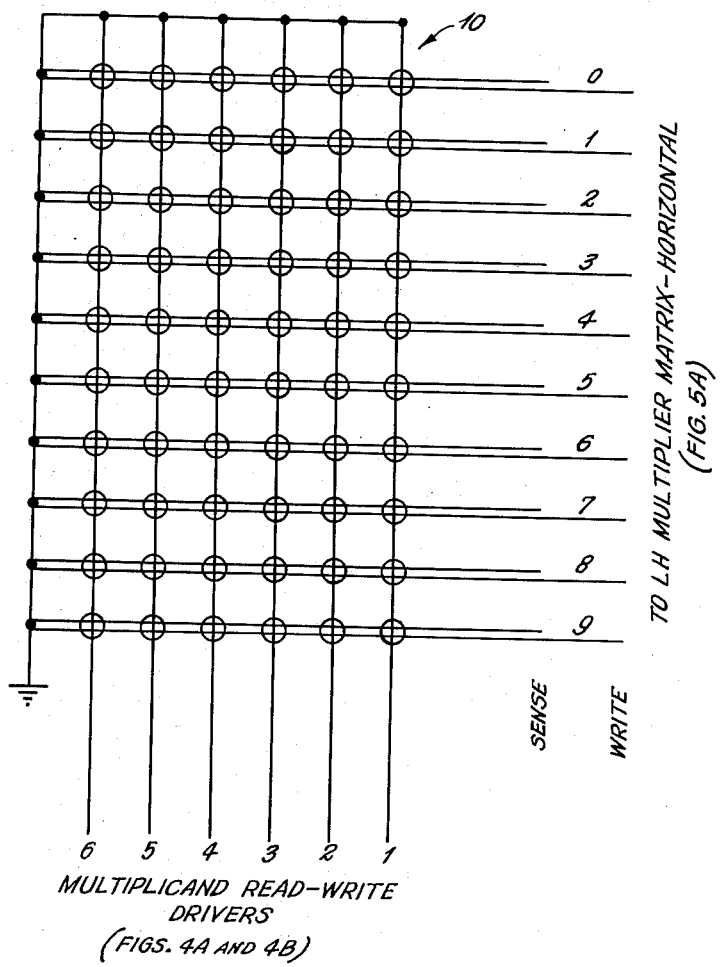
Figure 4A:
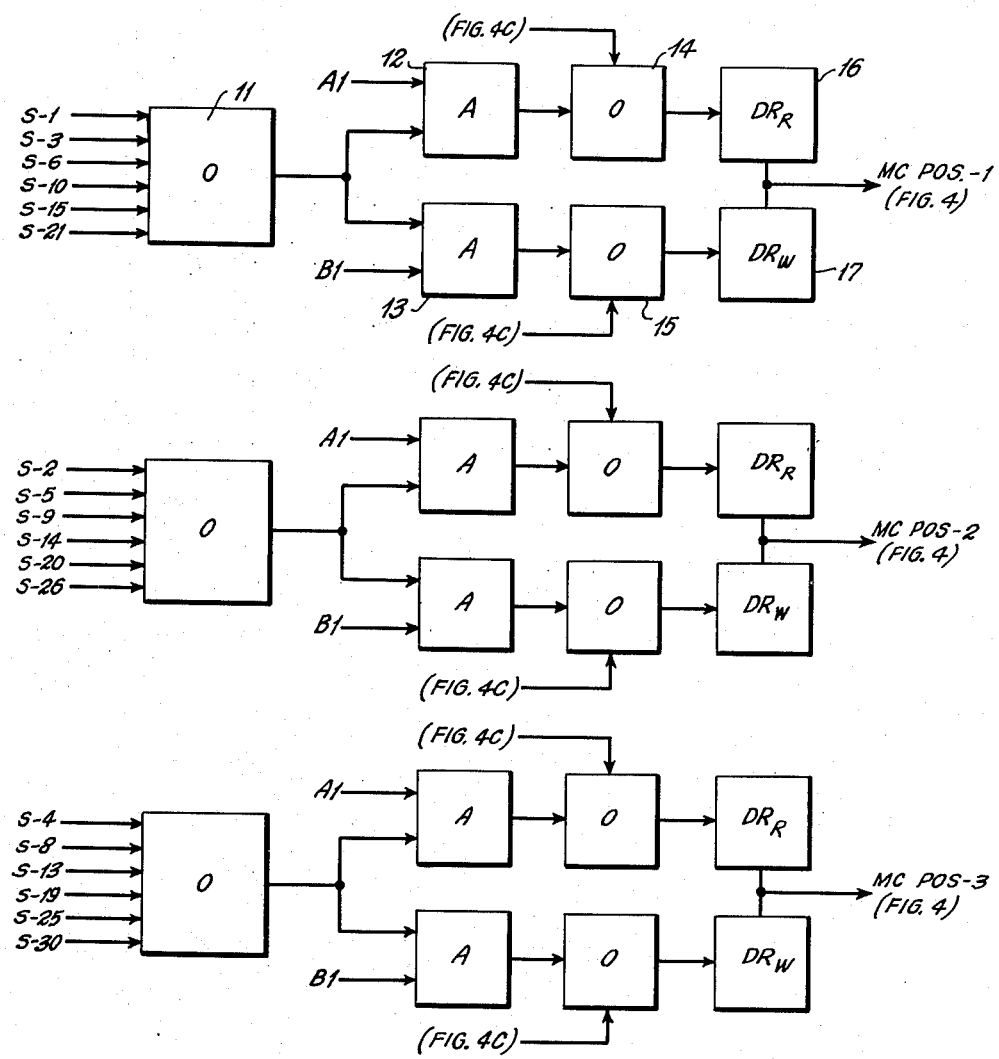
Figure 4B:
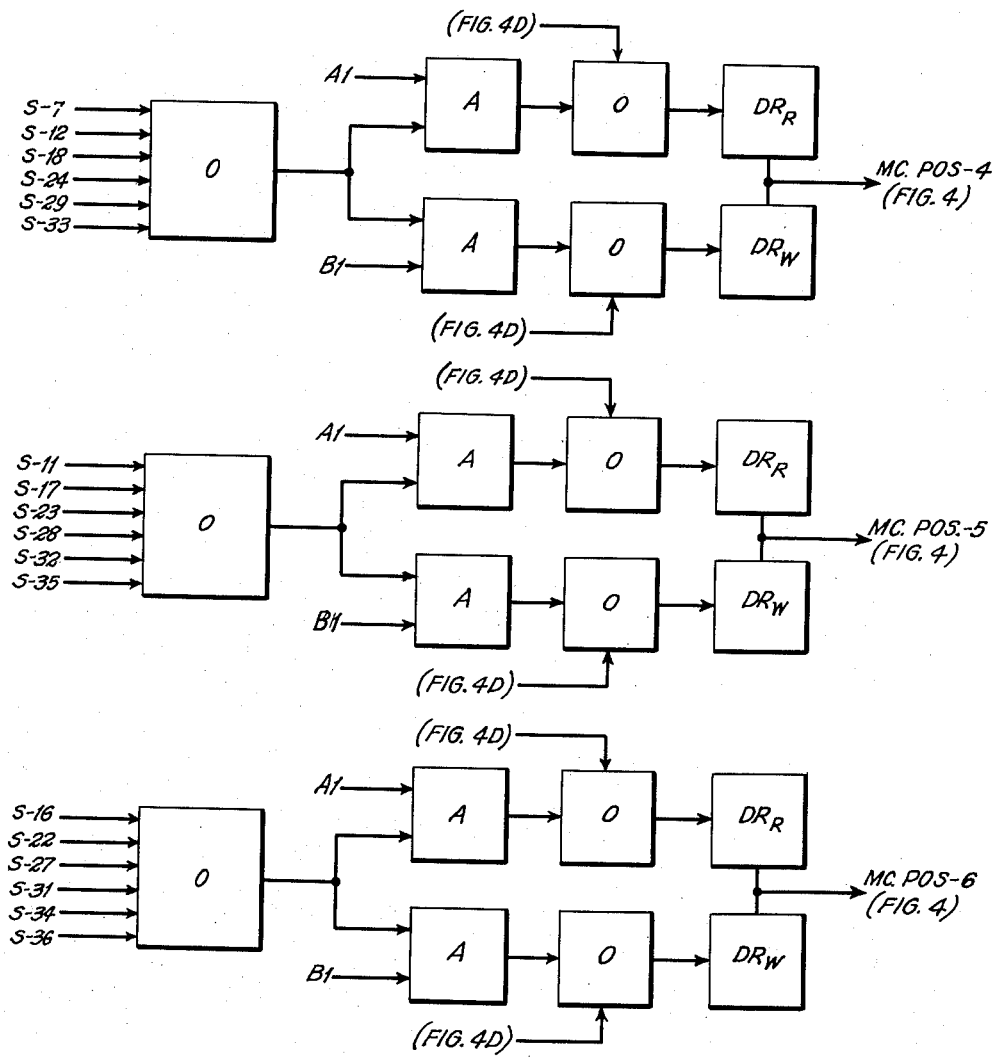
Figure 4E:
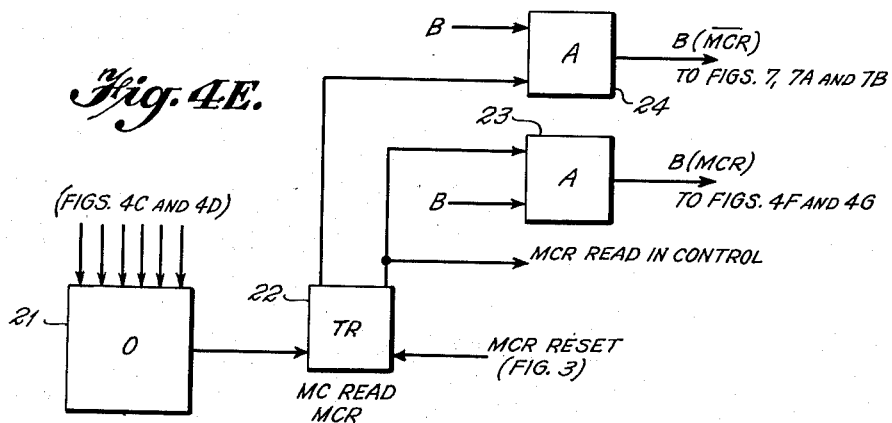
Figure 4F:
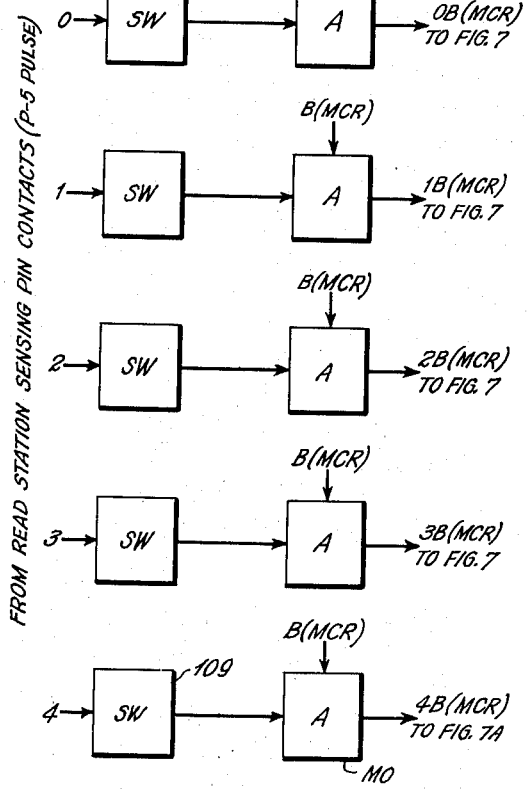
Figure 4G:
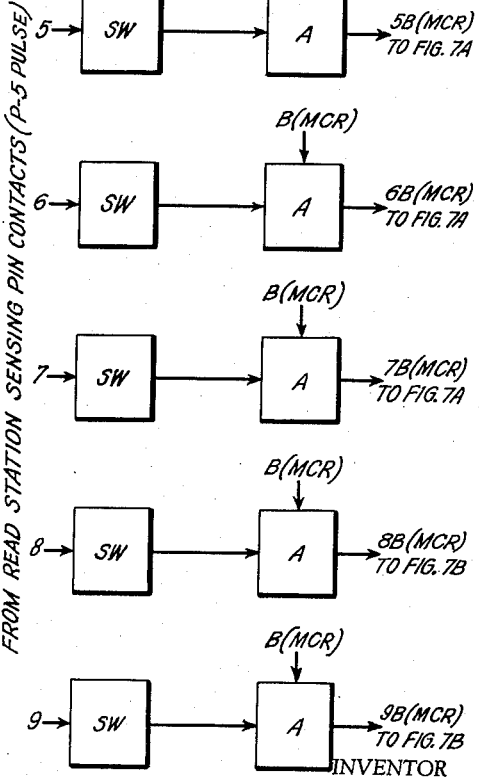
Figure 5:
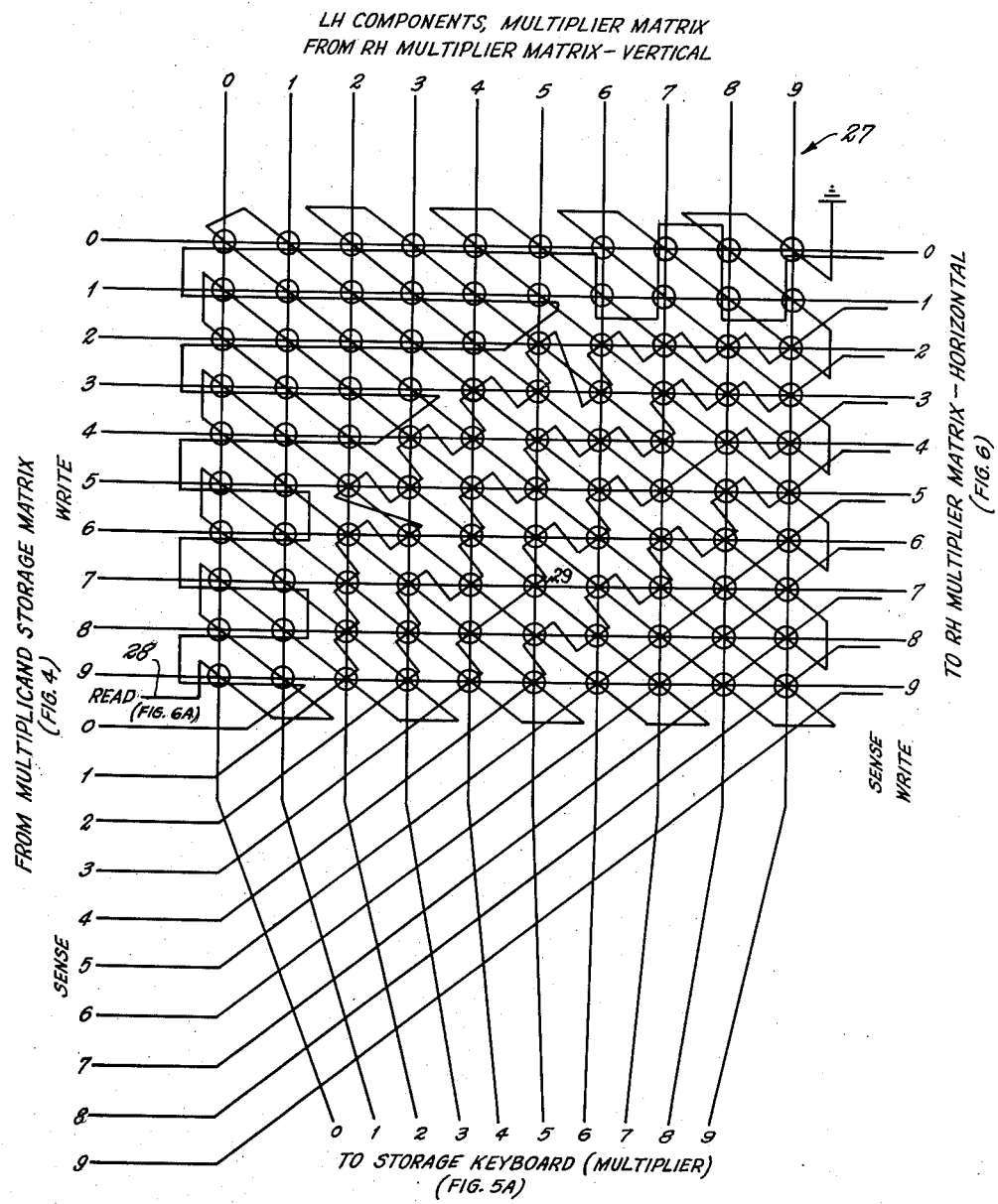
Figure 5A:
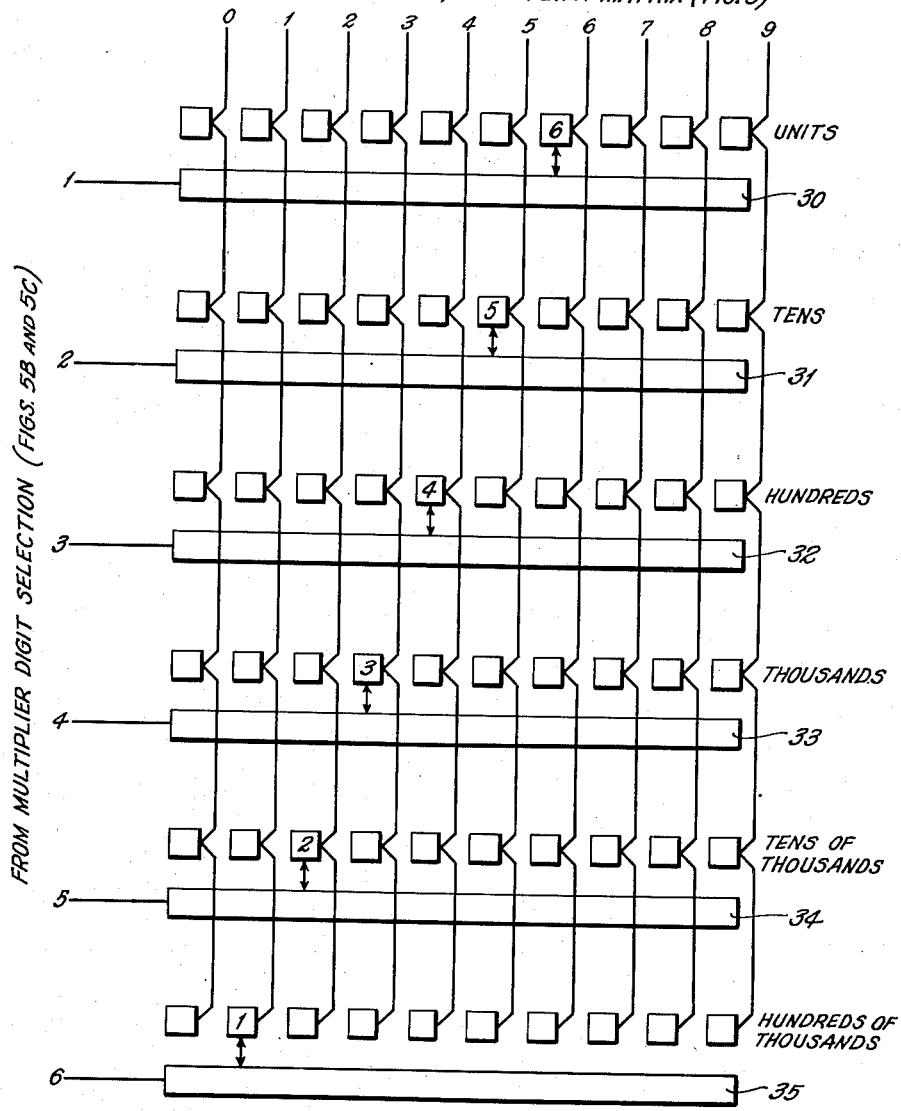
Figure 7A:
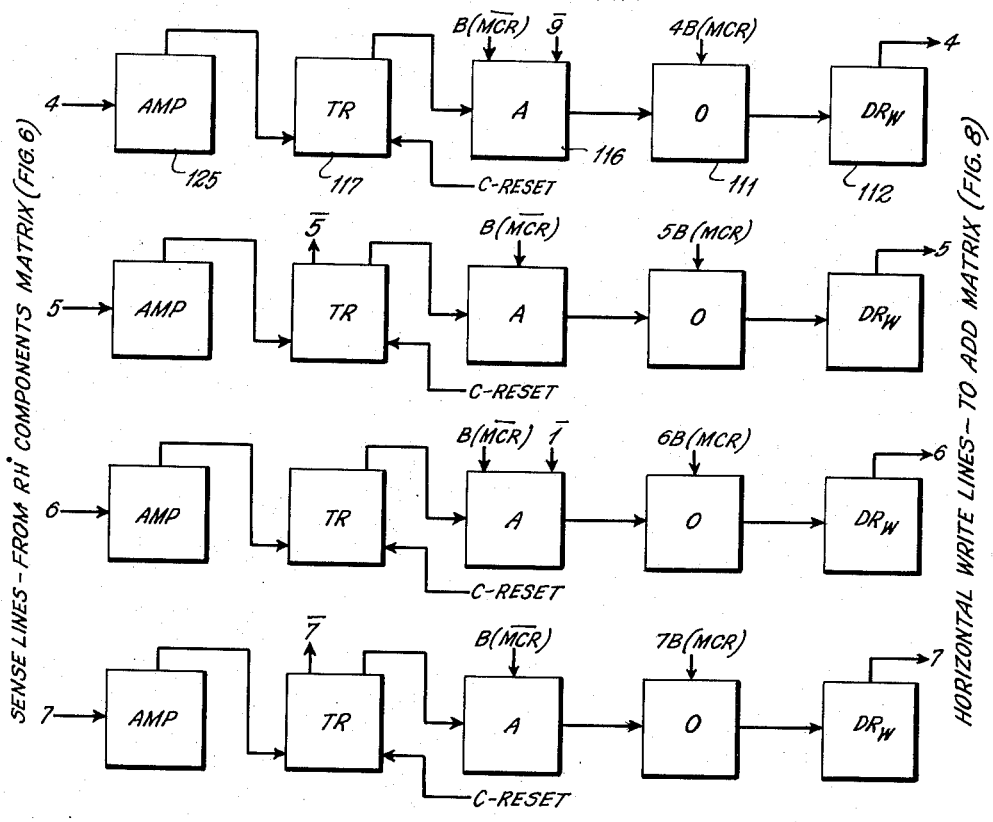
Figure 7B:
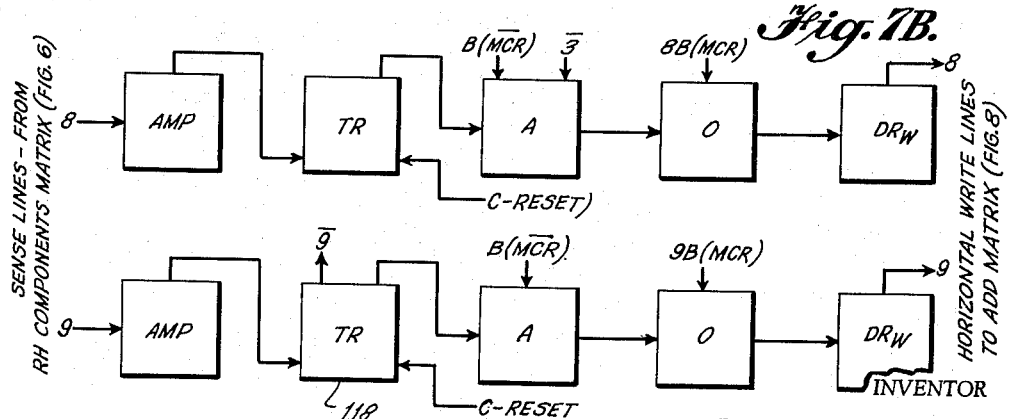
Figure 9:
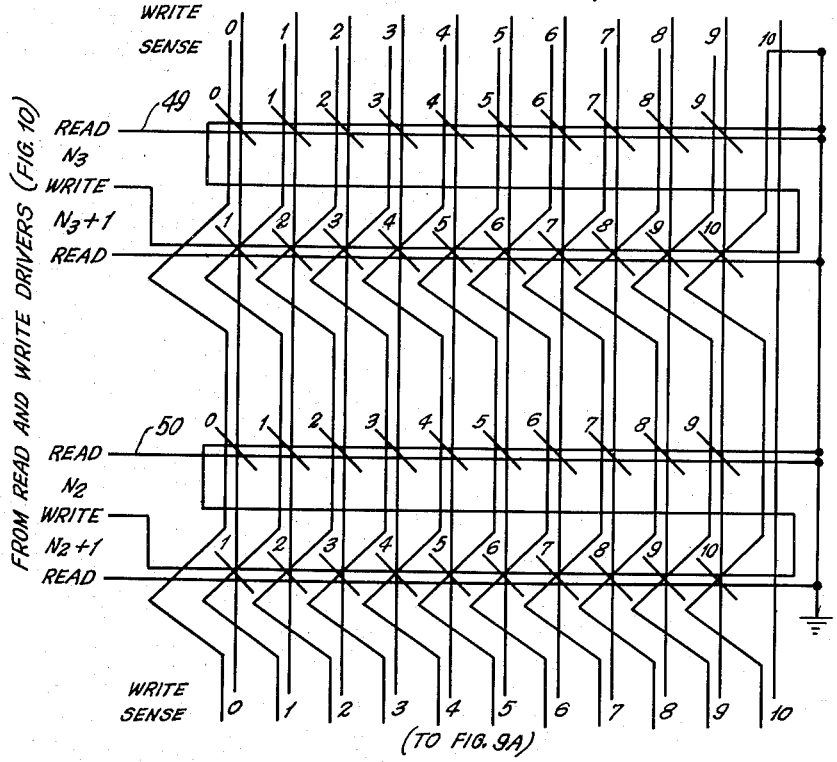
Figure 9A:
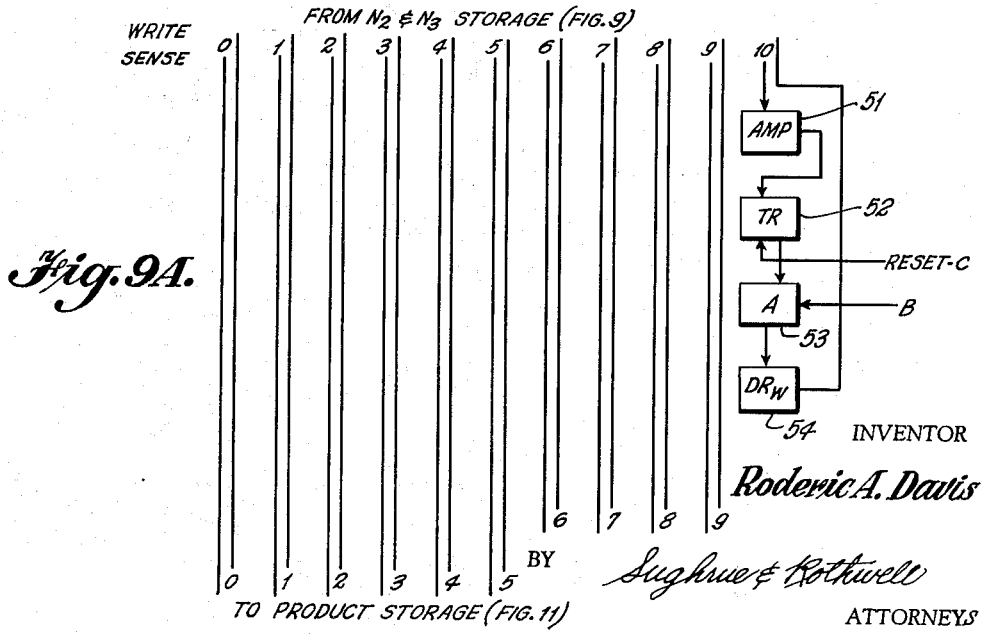
Figure 11:
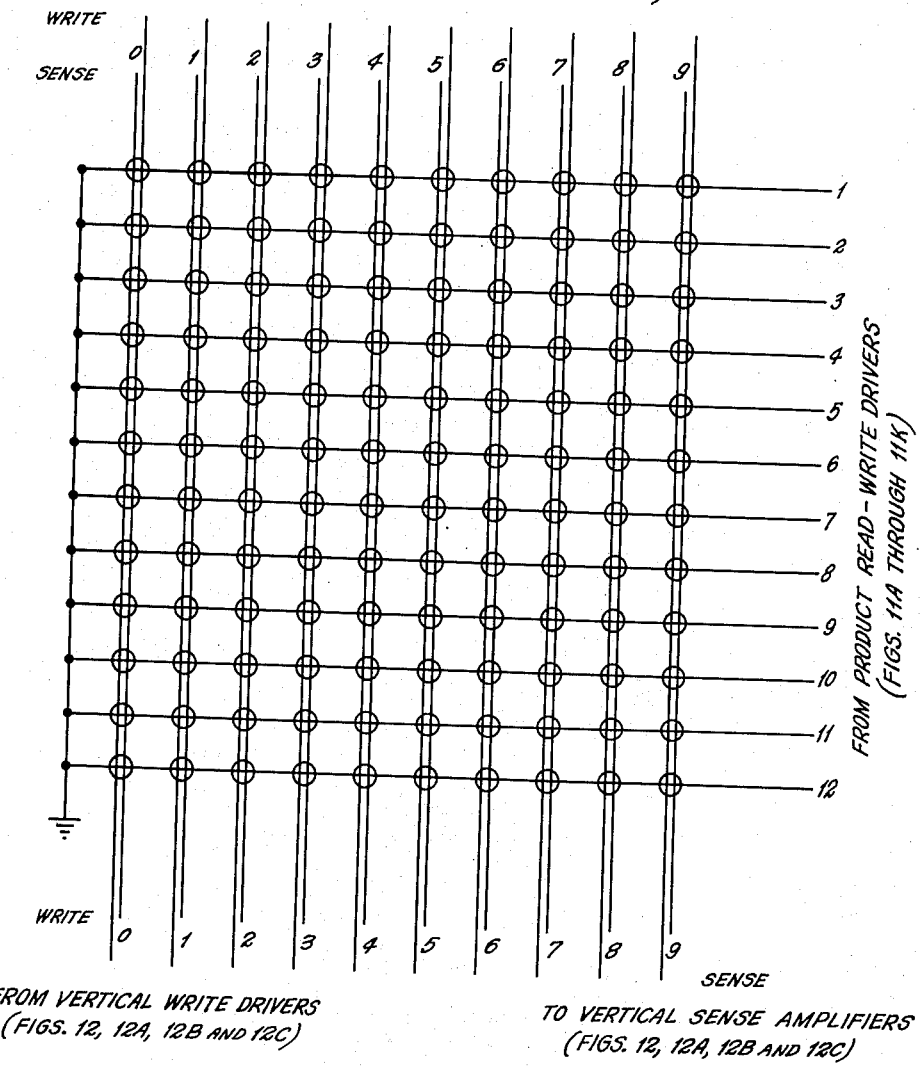
Figure 11A:
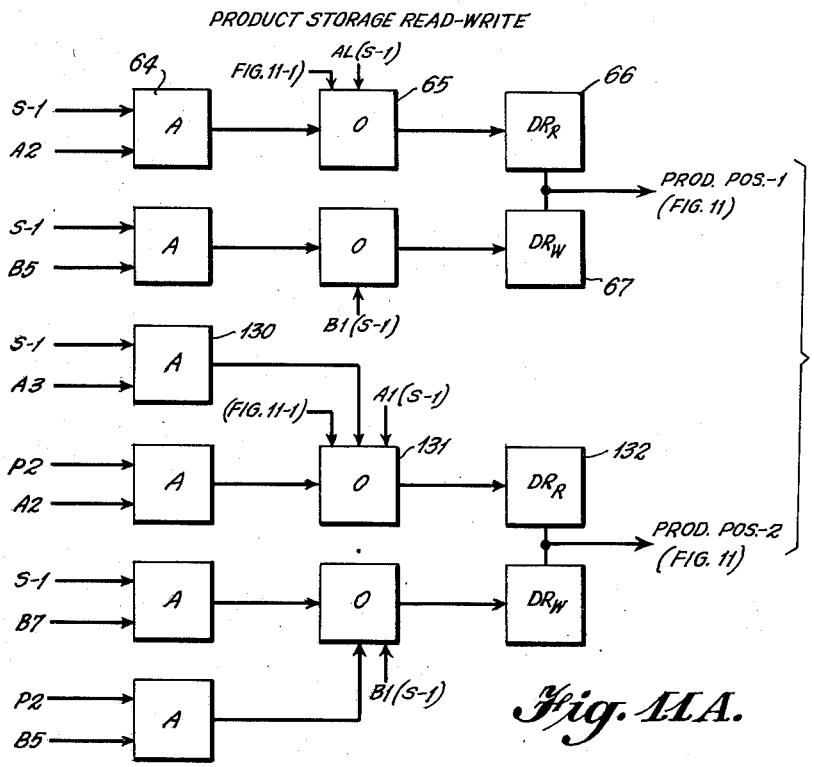
Figure 11B:
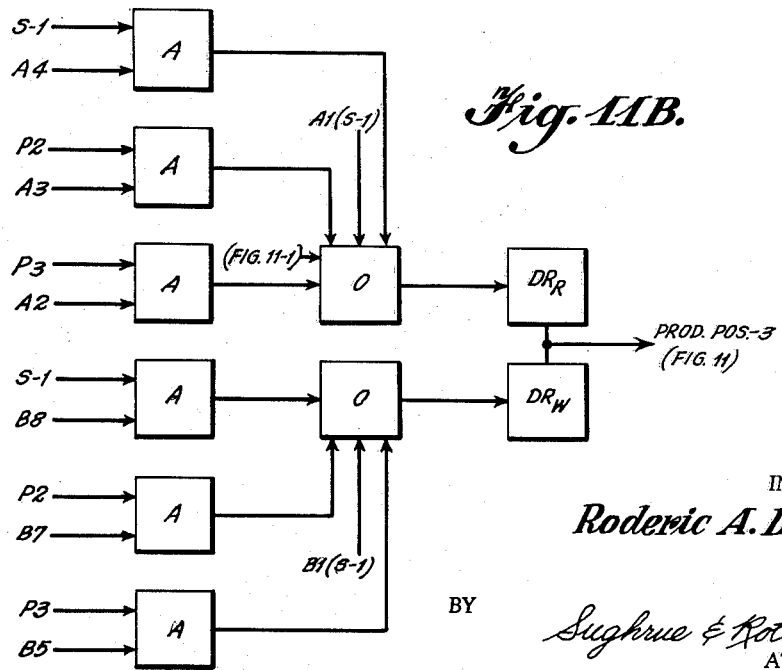
Figure 11G:
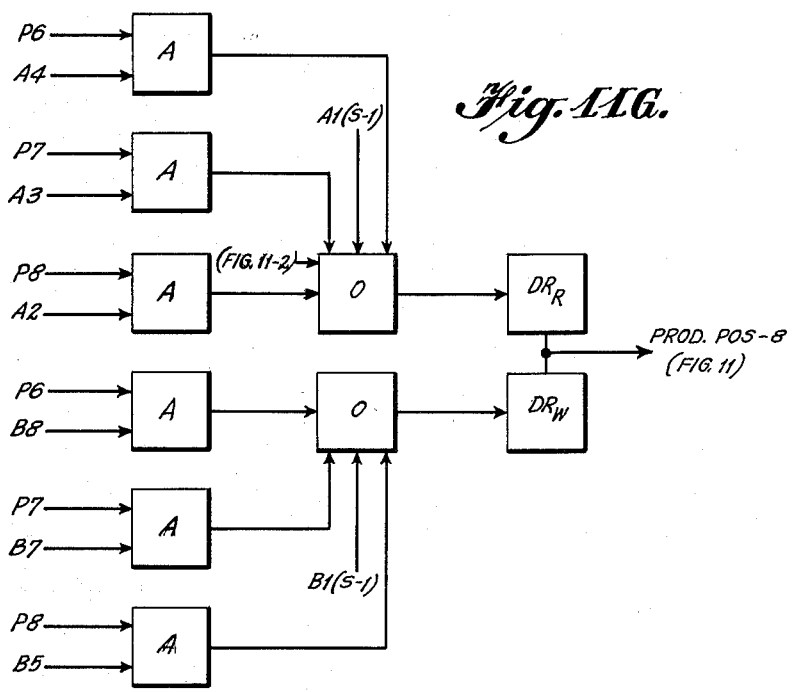
Figure 11H:
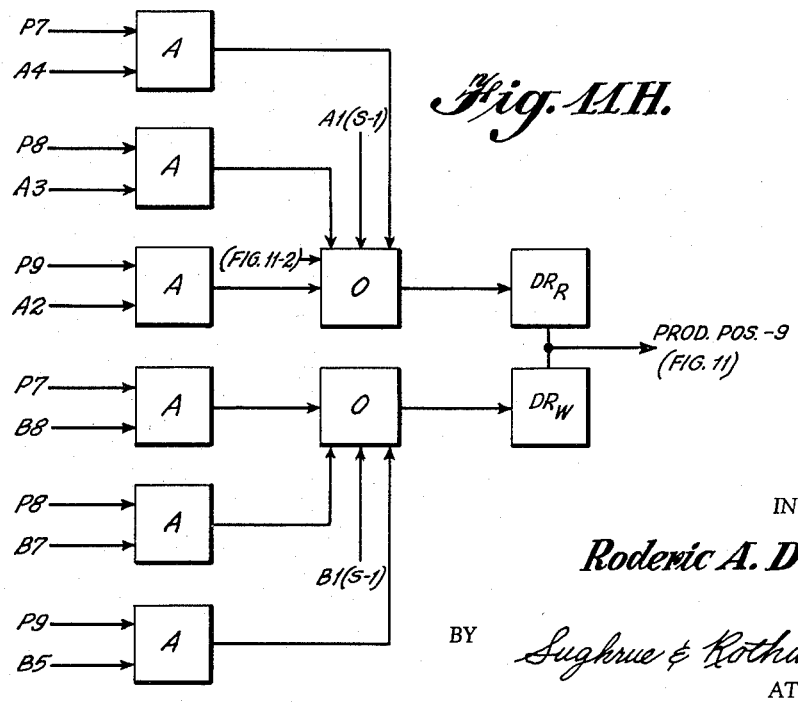
Figure 11I:
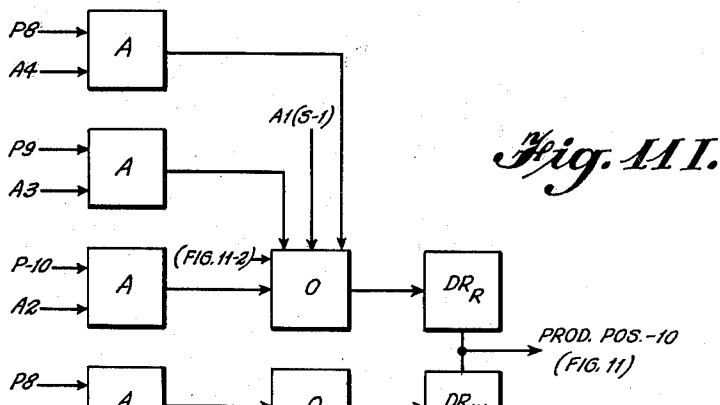

FIGURES 3d through 3k, inclusive, are diagrammatic views showing the production of the pulses employed in secondary operation selection;

FIGURE 4 is a diagrammatic view showing a core matrix for storage of the multiplicand;

FIGURES 4a and 4b are diagrammatic views showing the multiplicand selection and the read and write drivers for each position of the multiplicand;

FIGURES 4c and 4d are diagrammatic views showing the multiplicand read-in control;

FIGURES 4e, 4f, and 4g are diagrammatic views showing the horizontal sense-write control;

FIGURE 5 is a digrammatic view showing the left-hand component's multiplier matrix;

FIGURE 5a is a diagrammatic view showing the storage keyboard for the multiplier;

FIGURES 5b and 5c are diagrammatic views showing the multiplier digit selection;

FIGURE 6 is a diagrammatic view showing the right-hand component's multiplier matrix;

FIGURE 6a is a diagrammatic view showing the write drivers for both the right-hand component and left-hand component matrices;

FIGURES 7, 7a, and 7b are diagrammatic views showing the horizontal sense-write controls;

FIGURE 8 is a diagrammatic view showing the add matrix;

FIGURE 8a is a diagrammatic view showing the add matrix read control and read driver therefor and also showing the multiply on-off control;

FIGURES 9 and 9a are diagrammatic views showing the carry propagation matrix;

FIGURE 10 is a diagrammatic view showing the carry propagation;

FIGURE 11 is a diagrammatic view showing the product storage matrix;

FIGURES 11a to 11k are diagrammatic views showing the product storage read-write controls;

FIGURES 11—1 and 11—2 are diagrammatic views showing the product punch control unit;

FIGURE 11—3 is a diagrammatic view showing the vertical sense-write control unit;

FIGURE 11—4 is a diagrammatic view showing the reset product storage to zero unit;

FIGURES 12, 12a, 12b and 12c are diagrammatic views showing the vertical sense-write and product punch unit.

Although this invention finds specific utility in conjunction with a record card machine, its general utility is not so limited. In a record card machine of the type disclosed and claimed in application Serial No. 509,505, filed May 19, 1955, by Roderic A. Davis, Robert M. Gustafson, and Stephen Hnat, entitled "Availability Punch," a record card containing data in the form of perforations positioned in discrete columns of said card is fed to a read station where said data is read column by column into the machine. Additional data is introduced into the machine from a storage keyboard which is manually operated. The data fed to the machine is processed thereby and the result is stored. The result is read-out from the machine and employed to operate punches to store the result in another record card in the form of perforations therein, again in column-by-column sequence. It will be assumed in connection with the present invention that such a record card machine is employed. The card is the read station contains the multiplicand is selected columns thereof, the decimal value of any particular digit being a function of the position of the perforation in said column. Sensing pins are provided which sense the perforations in column-by-column fashion. There are ten such pins identified as 0 to 9, inclusive. If, for instance, a 4 is punched in the column being read then pin 4 will provide an impulse to the multiplier of this invention. To locate the ordinal position of this 4, the read station also provides to the multiplier a column emitter impulse identifying the particular column being read at the time of the decimal pin impulse. The multiplier is manually stored in a storage keyboard. Once the record card containing the multiplicand is stored in the multiplier and the storage keyboard has been manually operated to store therein the multiplier, the record card escapes to the next column following the most significant ordinal digit of the multiplicand. In this column an impulse (Multiply On) is supplied to the multiplier of this invention to initiate the multiplication operation. Selected digits of the multiplier and multiplicand are processed by the multiplier of this invention to provide partial products which are accumulated in a product storage device. As soon as all the partial products have been accumulated and a final product developed, the multiplier of this invention provides another impulse (Multiply Off) which initiates the reading out of the product from product storage to the card punching station. There the card which is to contain the product is punched column by column to store the final product thereon in the form of perforations in discrete columns therein.

Referring to FIGURE 1, there is illustrated the multiplication of multiplicand 987654 and multiplier 123456. The multiplication progresses by a sequential selection of a digit of the multiplier and a digit of the multiplicand to provide a partial product. These partial products are identified in the partial products columns of this figure. The accumulated partial products are identified in the developed product column. Since there has been selected for illustration purposes a six-digit multiplicand a six-digit multiplier, the complete multiplication involves 36 steps identified as 1 to 36, inclusive, in which a particular digit of the multiplier and a particular digit of the multiplicand are selected for production of a partial product. For instance, the first step involves the multiplication of digit 1 of the multiplier (6) and digit 1 (4) of the multiplicand. The partial product resulting from this multiplication is 24. The accumulated partial product for the first step is 24. The second step involves a multiplication of the first digit of the multiplier (6) and the second digit of the multiplicand (5) to produce a partial product 300. The 0's after the first two most significant ordinal positions of the partial product are ignored. The selection of digits and the accumulation of partial products proceeds through step 36. After the accumulation of the partial product resulting from step 36, the final product is developed. The product is developed from right to left. Three positions of the product are active at all times. The left-hand position of activity accumulates carries only. When the field of activity shifts one position to the left, the position vacated contains a digit of the final product. It can be seen from an examination of the partial products that the digits of the multiplicand and multiplier are so chosen that a sequence of groups is provided. Steps 2 and 3, for instance, identify one group and steps 4, 5, and 6 identify another group. Each group is composed of a sequence of digit multiplications. All pairs of digits of the multiplicand and multiplier which will produce partial products whose digits are in the same ordinal position of the product are incorporated in one group. Again with relation to steps 4, 5, and 6, the partial products produced have digits in the thousands, hundreds, tens, and units ordinal position of the product. Here again the 0's in the tens and units positions are ignored. The sequence of groups are selected so that each group of partial products comprising the group contains a larger order ordinal position than the preceding group. It can be seen that the group composed of partial products from steps 4, 5, and 6 contains a digit in the thousands position and the next group produced by steps 7, 8, 9, and 10 contains a digit in the tens of thousands ordinal position.

While there has been illustrated the development of a final product from six digit numbers, numbers having smaller or larger digits may of course be employed. It may be that the digits in the multiplicand and multiplier may be so large that more than three positions of the final product are active at all times. In the case of the activity of four positions, it would be necessary to provide three carry orders. With relation to the instant example in which three positions are active at all times, the least significant ordinal position of the product which is active is identified as $N_2$. The next most significant ordinal is identified as $N_3$. The most significant active ordinal position is identified as $N_4$. There is a carry from the $N_2$ position to the $N_3$ position and this carry is identified as the $N_2$ carry. There is also a carry from the $N_3$ to the $N_4$ position and this carry is identified as the $N_3$ carry. In any event, however, regardless of the number of digits in the multiplier and multiplicand, the apparatus of this invention provides the minimum number of carry orders in developing the final product.

A description of the units will now be given.

DESCRIPTION OF UNITS

(1) Multiplicand Storage Matrix (FIGURE 4)

This matrix 10 is composed of a plurality of vertical columns and horizontal rows of magnetic cores. These cores are bistable devices and have a substantially rectilinear hysteresis characteristic. Each column represents a position of the multiplicand and each row a digit. Thus, any core switched will represent a specific digit stored in a specific position. Each core requires W amount of current through the write lines thereof to switch said core from a normal stable state of remanence to the opposite stable state thereof. Each column of cores is wound with a vertical read-write line 1 to 6, inclusive, from the read-write multiplicand drivers of FIGURES 4a and 4b. These lines provide either a write W/2 current pulse to the column or a read R current pulse to the column. The R pulse is of a polarity and amplitude to return a core to its normal state and to provide an output from said core only if said core had been previously switched to its other stable state by two simultaneous W/2 pulses affecting said core. Each row of cores is wound with a horizontal sense line and a horizontal write line identified as 0 horizontal write or sense line, 1 horizontal write or sense lines, etc. Each horizontal write line is adapted to provide a W/2 pulse to the cores in a particular row and switch that single core in said row intersected by simultaneous W/2 pulses. The write lines must pass through individual cores in such a way that the two W/2 pulses pass through the core in the same direction and combine to switch said core. Upon the application of an R pulse, the switched core provides a sense pulse upon a horizontal sense line for the row containing said core. The R pulse provides a current to a core in an amount equal to or somewhat greater than the minimum amount necessary to switch the core. The direction of the R pulse is opposite to that of the W/2 pulses. After the multiplicand has been stored in the matrix by means later to be described in connection with the Multiplicand Read-Write unit of FIGURES 4a and 4b, selected digits are read-out and made available at the horizontal sense line outputs of the matrix. Means are provided to again write into the matrix a digit previously read out.

(2) Multiplicand Read-Write Unit (FIGURES 4a and 4b)

This unit includes a group of six pairs of drivers, a read driver ($DR_r$) and a write driver ($DR_w$) for each position of the Multiplicand Storage Matrix of FIGURE 4. These drivers may be thyratrons so arranged that current flows in one direction when one type is fired and in the opposite direction when the other type is fired. These drivers provide the R and W/2 pulses to the vertical read-write lines of the multiplicand storage matrix. The drivers in each pair are arranged back-to-back to provide their pulses in opposite direction as required. The drivers are controlled by program unit pulses identified as S-1, S-2, etc., to read and write at specific times as required. In addition, these drivers are controlled by multiplicand read-in control pulses from the Multiplicand Read-in Selection Control of FIGURES 4c and 4d. This controls the initial read-in of the multiplicand. Taking as an example the generation of R pulse and W/2 pulse for MC position −1 of the Multiplicand Storage Matrix, the application of a program unit pulse such as S-1 to OR gate 11 will provide an output therefrom to condition AND gates 12 and 13. Upon the application to these AND gates of pulses A1 and B1, the OR gates 14 and 15 will provide outputs therefrom to fire the read driver 16 and the write driver 17. This results in the application of an R pulse or a W/2 pulse to MC position −1 column of cores in the Multiplicand Storage Matrix of FIGURE 4. The other MC positions are similarly energized.

(3) Multiplicand Read-in Control
(FIGURES 4c through 4g)

This group of circuits provides the control of the Multiplicand Storage Matrix horizontal and vertical read and write lines required for reading the multiplicand from the card and storing it in the Multiplicand Storage Matrix 10 of FIGURE 4. These circuits also control rewriting of a multiplicand digit after it has been selected and used in a multiplication step. Turning first to FIGURE 4c, 4d, and 4e, the application of impulses from positions of the column emitter corresponding to the card columns of the multiplicand, these column emitter impulses being applied to terminals identified as MC–1 to MC–6, inclusive, will close the switches (SW) associated therewith to condition AND gates (A) associated therewith. These switches may be cathode followers. The application of A pulses and B pulses to these AND gates provide control pulses for the drivers associated with the MC positions of the storage matrix. For instance, the application of an impulse from the column emitter to terminal MC–1 will close switch 18 to condition AND gates 19 and 20. The application of an A pulse to AND gate 19 will provide a pulse to OR gate 14 of FIGURE 4a to fire read driver 16. The application of a B pulse to AND gate 20 will provide a pulse to OR gate 15 to fire the write driver 17. The other MC positions are similarly energized. It can be seen also that the closing of any of the switches, such as switch 18, will provide a pulse to OR gate 21 which will set MCR trigger 22. While in this set condition this trigger will provide a pulse identified as an MCR read-in pulse. It will also condition AND gate 23. The application of a B pulse to AND gate 23 will provide pulse B(MCR). The application of a B pulse to AND gate 24 will provide pulse B($\overline{MCR}$) whenever trigger 22 is in the reset condition. Trigger 22 is reset by pulse MCR to its reset input.

Referring to the Horizontal Sense-Write Control portion of the Multiplicand Read-in Control as shown in FIGURES 4f and 4g in combination with FIGURE 4e, this unit consists of a plurality of switches controlling AND gates to generate the 0B(MCR), 1B(MCR), etc., pulses which are fed to the horizontal sense-write circuit. The inputs to the switches are obtained from the Read Station Sensing Pin contacts and an impulse, for instance, on the 0 pin contact will close switch 25 to condition AND gate 26. Upon the application of pulse B(MCR) from AND gate 23, the output of AND gate 26 provides pulse 0B(MCR). The other sensing pin contact channels are similarly energized.

The outputs from the AND gates such at 26 are applied to control the horizontal sense-write drivers shown in FIGURES 7, 7a, and 7b.

(4) Multiplier Matrix Left-Hand Component
(FIGURE 5)

This matrix 27 is composed of a ten by ten array of magnetic cores. To the left, as viewed in this figure, are the horizontal write lines 0 to 9, inclusive, which connect to similarly designated write lines in the Multiplicand Storage Matrix 10. The horizontal sense lines on the left-hand side of this matrix are identified as horizontal sense lines 0 to 9, inclusive, and connect to similarly designated sense lines in the Multiplicand Storage Matrix 10. These ten rows of cores are intersected by the horizontal write lines which connect on the right-hand side of this matrix to the Multiplier Matrix Right-Hand Component of FIGURE 6. The vertical columns of cores are intersected by vertical write lines 0 to 9, inclusive, from the Storage Keyboard-Multiplier of FIGURE 5a. These write lines also connect to the vertical write lines 0 to 9, inclusive, of the Multiplier Matrix Right-Hand Component of FIGURE 6. A read line 28 intersects all the cores in this matrix. Upon the application of an R pulse from the Right-Hand Read unit of FIGURE 6a, a core in this matrix will be switched which represents the left-hand component of the product of the multiplication of the selected multiplicand digit and selected multiplier digit. The horizontal sense lines are connected such that the switching of this particular core provides an impulse on said horizontal sense line which has a decimal designation from 0 to 9 representative of said left-hand component. For example, if the keyboard provides a W/2 pulse on the 5 vertical write line and the 7 horizontal write line is provided with a W/2 pulse, then core 29 will be switched. Upon the application of an R pulse to this matrix, core 29 will reset and the horizontal sense line 3 will be provided with an impulse thereon. This of course presents the left-hand component 3 of the multiplication of 7 and 5.

(5) Storage Keyboard-Multiplier (FIGURE 5a)

This unit is comprised of a manually operated keyboard capable of mechanically storing six digits. It is provided with six inputs from the Multiplier Selection and Write unit of FIGURES 5b and 5c identified as inputs 1 to 6, inclusive. These inputs connect to conducting bars 30 to 35, inclusive. By depressing a key in each of the significant ordinal positions of the multiplier indicative of the decimal value of that significant position, contact is made between the vertical write lines 0 to 9, inclusive, and the inputs 1 to 6, inclusive, from the Multiplier Select and Write unit of FIGURES 5b and 5c. Thus by selecting and impulsing one of the input lines, the digit stored in that position can be read out to the left-hand and right-hand component matrices to effect a multiplication. The selecting and impulsing of one of the input lines applies a W/2 pulse to the appropriate vertical write line.

(6) Multiplier Select and Write
(FIGURES 5b and 5c)

This unit consists of a group of six write drivers ($DR_w$), one for each position of the multiplier. These drivers are controlled by program impulses to read specific positions of the storage keyboard at specific times. This results in writing into the left-hand and right-hand component matrices the selected multiplier digit to effect a multiplication. As is shown here in connection with multiplier position −1 which connects to input 1 of the Storage Keyboard-Multiplier of FIGURE 5a, the write driver 36 is fired to provide a W/2 pulse to said input 1 upon the simultaneous application of pulse B1 and an output from OR gate 37 to AND gate 38. OR gate 37 is provided at its input with various program pulses. The channels for the other multiplier positions are similarly energized.

(7) *Multiplier Matrix Right-Hand Component (FIGURE 6)*

This matrix 39 is divided into two sections 40 and 41. Each section is composed of a five by five core array. The upper left-hand section 40 is composed of five columns representing the odd multiplier digits and five rows representing the odd multiplicand digits. Thus, if any core in this section 40 is switched it will represent the right-hand component of the product of the odd digits represented by the column and row in which it occurs. The lower right-hand section 41 is composed of five columns representing a pair of multiplier digits, one odd and one even, and each of the five rows in this section represents a pair of multiplicand digits, one odd and one even. Thus, any of these cores when switched in this section will represent the right-hand component of the product of either of the digits represented by the column and row in which it occurs, except that it does not represent the product of two odd digits. The product of two odd digits is contained in the section 40. The pairing of the digits is as follows: 0 and 5, 4 and 9, 2 and 7, 3 and 8, and 1 and 6. It can be seen then that excluding multiplication of two odd digits, the multiplication of either of the two digits in any pair by either of the two digits in any other pair, a total of three multiplications, will always produce the same right-hand component and it will be an even digit. Thus, the cores in this section 41 represent all the even digits which may be produced by the multiplication of any two digits. The horizontal sense lines entering this matrix 39 at the left-hand side connect to associated horizontal sense lines in the Left-Hand Multiplier Matrix of FIGURE 5. The horizontal write lines entering this matrix from the left-hand side connect to corresponding horizontal write lines from the Multiplier Left-Hand Components Matrix of FIGURE 5. The vertical write lines entering this matrix 39 from the top connect to the vertical write lines from the Multiplier Left-Hand Components Matrix of FIGURE 5. The horizontal write lines at the right-hand side of this matrix 39 connect to the horizontal write lines of the Add matrix of FIGURE 8 and the horizontal sense lines on the right-hand side of this matrix connect to the Horizontal Sense-Write unit of FIGURES 7, 7a, and 7b. The read line 42 intersects all the cores in matrix 39 and is provided with a read pulse R from the Right-hand Read unit of FIGURE 6a.

Switching of the cores (write) is effected by the horizontal and vertical write lines. The even lines pass through all the cores in each row and column, respectively, of the section 41. The odd lines pass through all the cores of each row and column, respectively, of both sections 40 and 41. By impulsing one horizontal and one vertical write line simultaneously and controlling the current in each line to be half that required to switch the core, a W/2 pulse, the core representing the right-hand component of the product of the input digits will be switched, affecting production and storage of that digit. If the digit is odd it will be in the section 40, if it is even it will be in the section 41. It will be noted that input of two odd digits will actually switch a core in each section. Resolution of this situation will be explained later. As with all core matrices, the write lines must pass through the cores in such a way that the two W/2 pulses pass therethrough in the same direction.

Switching of the cores (read) is affected by impulsing read line 42 which passes through all the cores in the matrix 39 and controlling the current so that it is equal to or somewhat greater than the minimum current required to switch a core, and in a direction through the core opposite to the current direction in the write operation. In this way, any core or pair of cores which have been switched by a previous write (multiply) operation may be switched back to the normal state.

In switching back to the normal state, any core will induce a voltage in another line, a horizontal sense line, which pass therethrough. There are ten such sense lines, one for each digit. Each even line passes through all the cores in the section 41 representing the same digit. Each odd sense line passes through all the cores in section 40 representing the same digit.

If the extension or multiplication involves two even digits or an even and an odd digit, the output will appear on an even horizontal sense line. If the multiplication involves two odd digits, a core will be switched in both of the sections and there will be a desired output on one odd horizontal sense line and an undesired output on one even horizontal sense line. It can be seen that digits occurring in this double output are always coupled in the same pairs as the horizontal and vertical write lines as described above. This makes it possible for the sensing circuits, namely, the Horizontal Sense-Write unit of FIGURES 7, 7a, and 7b, to suppress or inhibit the undesired output by permitting acceptance of an even output only if its odd mate is not present.

To illustrate an example of a production of an undesired or trivial output from this matrix, let it be assumed that the selected digit of the multiplicand is 7. This is applied to 7 horizontal write line. The horizontal write lines for the purpose of this matrix may be considered the X writing means. Further, let it be assumed that the multiplier digit is 9 and is applied to 9 vertical write line. The vertical write lines may be considered as the Y writing means for this matrix. The X and Y writing means apply a pair of independent variable values to this matrix. It can be seen that because the two digits introduced to the matrix are both odd, a core in sub-matrix 40 intersected by 3 horizontal sense line is switched as well as a core in sub-matrix 41 intersected by 8 horizontal sense line. The correct dependent value is of course 3 and the trivial value is 8. Turning for a moment to the Horizontal Sense-Write unit of FIGURES 7, 7a, and 7b, it can be seen that the input to this unit on 3 horizontal sense line will fire the write drive circuit associated therewith but the input on the 8 horizontal sense line thereto will not fire the write drive circuit associated therewith because of the absence of a $\bar{3}$ pulse to the AND gate associated with this horizontal sense line channel. Each even horizontal sense line channel is provided with a complement pulse which must be present in order for the write driver associated with the particular even channel to be fired. For instance, the 2 horizontal sense line channel is provided with a complement 7 pulse.

It should also be noted that the vertical write lines are common to both the left-hand and right-hand component matrices to permit simultaneous writing in both of these matrices.

(8) *Horizontal Sense-Write Unit (FIGURES 7, 7a and 7b)*

The horizontal sense lines from the Multiplier Left-Hand Component Matrix and the Multiplier Right-Hand Component Matrix and also from the Multiplicand Storage Matrix feed this unit. These horizontal sense lines 0 to 9, inclusive, feed horizontal sense line channels 0 to 9, inclusive. The 0 horizontal sense line channel is typical and includes an amplifier 43, the output of which feeds the set input of the 0 horizontal storage trigger 44. The set output of the trigger 44 feeds an AND gate 45. The output of AND gate 45 feeds OR gate 46. The output of OR gate 46 feeds write driver 47. It can be seen then that an impulse on 0 horizontal sense line from any of the three units previously identified will be fed to amplifier 43 and the output thereof will set trigger 44. When trigger 44 is set and proper program impulses are fed to AND gate 45, the output through OR gate 46 will fire the write driver 47 to provide a W/2 pulse on the appropriate horizontal write line of the Add Matrix of FIGURE 8, the Multiplier Right-Hand Components Matrix of FIGURE 6, the Multiplier Left-Hand Components Matrix of FIGURE 5, and the Multiplicand Storage Matrix of FIGURE 4.

Thus, any digit read out of the matrices of FIGURES 4, 5, and 6 may be written or rewritten in any of these three units. In addition, these write drivers in this unit may be impulsed by other program impulses, from the Horizontal Sense-Write Control unit of FIGURES 4e, 4f, and 4g conditioned by Read Station Sensing Pin contacts, through the OR gate such as OR gate 46, to provide horizontal write W/2 pulses for initial storage of the multiplicand.

(9) Add Matrix (FIGURE 8)

This core matrix functions to produce the sum of any two digits. It is composed of 110 cores arranged in eleven columns and ten rows. Each column represents one of the digits 0 to 10 and each row represents one of the digits 0 to 9. Thus, any core when switched will represent the sum of two digits represented by the column and row in which it occurs. The necessity for the 10 column as well as the 0 column will be illustrated at a later point. Switching of the cores (write) is effected by horizontal and vertical write lines passing through all the cores in each row and column respectively. By impulsing one horizontal write line and one vertical write line simultaneously and controlling the current as described for the other matrices, the core representing the sum of the input digits will be switched affecting production and storage of that digit. The horizontal write lines 0 to 9, inclusive, entering this matrix from the right-hand side connect to the Horizontal Sense Write unit of FIGURES 7, 7a and 7b. The horizontal write lines from the left-hand side of this matrix connect to the horizontal write lines of the Multiplier Right-Hand Components Matrix of FIGURE 6.

Switching of the cores (read) is effected by impulsing the read line 48 with an R pulse obtained from the Read-Adder unit of FIGURE 8a. This read line intersects all of the cores in this add matrix. Any core switched by a previous write (add) operation will be switched back to its normal state by the R pulse. In switching back to the normal state, any core will induce a voltage in vertical sense lines 0 to 9, inclusive, entering this matrix from the bottom. There are ten vertical sense lines, one for each digit, each of which passes through all cores representing the same digit. In addition to the voltage induced in a vertical sense line by the R pulse in switching a core back to its normal state, a signal is also induced in either an NDC (no carry) line or a DC (carry) line. If the sum of the digits added by this add matrix is less than 10, a signal will appear upon reading the matrix in the NDC line. If the sum is 10 or greater, a signal will appear in the DC line. Thus, on every read operation there will be two outputs. One is recognized and utilized as the right-hand component of the sum of the two digits and the other will be recognized and utilized as the left-hand component of the same sum, that is, carry or no carry. The vertical sense lines connect to the Carry Propagation unit of FIGURES 9 and 9a. The vertical write lines also connect to this unit.

(10) Carry Propagation $N_2$ and $N_3$ Storage (FIGURES 9 and 9a)

This unit is designed to effect the addition of the digit 1 to two digits of the partial product to effect carries if required. This is accomplished by double storage of the two digits. The unit is composed of two pairs of two rows of cores with ten cores in each row, one for each digit. Vertical write lines 0 to 9, inclusive, one for each digit, pass through a core in each row. A horizontal write line passes through all of the cores in each pair of rows. Thus, through controlled impulses to the horizontal and vertical write lines, as with the other matrices, two digits may be stored in each pair of rows, with two cores switched for each digit. When the stored digit is required in the calculation, it may be read out of either of the two cores in which it is stored. If the adder output gives an NDC impulse, the upper row of the pair will be read by impulsing a read line 49 for $N_3$ and 50 for $N_2$ which passes through all the cores in a row. Switching the core back to its normal state by this R pulse will induce a voltage in that one of the eleven sense lines representing the digit stored. If the adder output gives a decimal carry (DC) impulse, the lower rows will be read with output on that sense line one higher than the digit stored. Thus, a carry has been effected. It should be recalled at this point that only three significant ordinal positions of the product are under development at any one time. The least significant position is identified by $N_2$. The next most significant position is identified by $N_3$. In developing the $N_2$ position there is a possibility of carry or no carry. This is also true in developing the $N_3$ position. The $N_4$ position, which is the most significant digit under development at any one time will, of course, either be a 0 or a 1 depending upon whether or not there is a carry resulting from the development of the $N_3$ position. Consequently, it can be seen that only two carries need be propagated during any particular operation. With no carry the $N_2$ or $N_3$ row of cores is utilized and if there is a carry the $N_{2+1}$ or $N_{3+1}$ row is used.

It will be noted that eleven sense lines are used. This is necessary as 9 raised by 1 equals 10, which must be distinguished from a normal 0 and must produce a carry when added to any of the other digits in the adder. The sense line which carries the 10 impulse upon reading of $N_{2+1}$ or $N_{3+1}$ feeds this impulse to amplifier 51. The output of amplifier 51 is fed to trigger 52 to set said trigger. The set output of the trigger 52 is fed to the AND gate 53 whose output is connected to the write driver 54. Trigger 52 is reset by a C pulse and AND gate 53 is conditioned by a B pulse. The W/2 pulse output from write driver 54 is fed through 10 vertical write line to the Add Matrix of FIGURE 8. The vertical write lines at the top of this unit connect to the associated write lines in the Add Matrix. This is true also of the vertical sense lines. The vertical write and sense lines at the bottom of this unit feed to the Product Storage Matrix of FIGURE 11.

(11) Carry Propagation Read-Write Control (FIGURE 10)

Upon the application of an NDC pulse from the Add Matrix of FIGURE 8 to amplifier 55, NDC trigger 56 is set. The set output from this trigger conditions AND gate 57. The output from AND gate 57 through OR gate 58 fires read driver 59. AND gate 57 and OR gate 58 are conditioned by appropriate programming impulses. The firing of read driver 59 provides an R pulse to the read input for the $N_3$ cores in the Carry Propagation Storage unit of FIGURE 9. The $N_2$ read channel is substantially identical, feeding an R pulse to the $N_2$ cores of FIGURE 9. The DC channel in this unit is substantially identical, feeding read pulses to the $N_{3+1}$ and $N_{2+1}$ cores of FIGURE 9. NDC trigger 56 and DC trigger 60 are reset by an output from OR gate 61 due to reset pulses C1 and C7.

B4 pulse to write driver 62 provides a W/2 pulse to the $N_3$ and $N_{3+1}$ cores in FIGURE 9 and B3 pulse to write driver 63 provides a W/2 pulse to $N_2$ cores and $N_{2+1}$ cores.

(12) Product Storage Matrix (FIGURE 11)

This unit provides storage for the twelve digits of the product. It is composed of 120 cores arranged in ten columns and twelve rows, each row representing a position of the product and each column a digit. Thus, any core when switched will represent a specific digit stored in a specific position. Its operation by horizontal and vertical write lines with the horizontal write lines also acting as the read lines, and with the vertical sense lines intersecting the column of cores with the associated vertical write line therefor, is identical with the operation of the Multiplicand Storage Matrix of FIGURE 4. The vertical write and vertical sense lines 0 to 9, inclusive, at the top of this matrix connect to associated lines in the Carry Propagation Storage unit of FIGURES 9 and 9a. The lines at the bottom of this unit connect to the Vertical Sense-Write and Product Punch unit of FIGURES 12, 12a, 12b, and 12c. The read-write lines 1 to 12, inclusive, connect to the Product Storage Read-Write unit of FIGURES 11a to 11k, inclusive. These lines provide either W/2 pulses or R pulses depending upon whether the operation is a read operation or a write operation.

(13) *Product Storage Read-Write Unit (FIGURES 11a to 11k, Inclusive)*

This unit provides the R pulses and W/2 pulses for the Product Storage Matrix of FIGURE 11. The channel for product position −1 of the product storage matrix is typical of the twelve ordinal position channels controlled by this unit. AND gate 64 is conditioned by appropriate program pulses to provide an output from OR gate 65 to fire the read driver 66. This provides an R pulse to the product position—1 row of cores in the product storage matrix. The write driver 67 is similarly energized to provide a W/2 pulse. In addition, the OR gates, such as OR gate 65, are controlled by program pulses to read the product storage position for punching or to reset the product storage matrix to 0.

(14) *Product Read-to-Punch and Vertical Sense Write Control (FIGURES 11–1, 11–2, and 11–3)*

This group of units provides the control of the Product Storage Read-Write unit of FIGURES 11a to 11k, inclusive, and the Vertical Sense-Write and Product Punch unit of FIGURES 12, 12a, 12b, and 12c. First, with relation to the vertical sense-write control portion as shown in FIGURE 11–3, impulses from the positions of the column emitter corresponding to the card columns in which the product is to be punched, which impulses are applied to the terminals PR–1 through PR–12 of FIGURES 11–1 and 11–2, switch the product read-out trigger (PRO) to its set condition. This trigger is identified by number 68. The impulses from the column emitter are applied to the OR gate 69 whose output feeds the set input of trigger 68. With the PRO trigger 68 in the set condition, PRO pulse, which is used for read-out control, is fed to the program control of FIGURE 3. PRO pulse is also fed to AND gate 69 which when conditioned by B pulse provides pulse B (PRO) to the Vertical Sense-Write and Product Punch unit of FIGURES 12, 12a, 12b, and 12c. With trigger 68 in a reset condition, pulse ($\overline{PRO}$) is fed to AND gates 70 and 71. Program pulses through the inverters 72, 73, and 74, OR gates 75 to 78, and AND gates 79 and 80, together with B pulses condition AND gates 70 and 71 to provide W pulse to the Vertical Sense-Write and Product Punch unit and V pulse also to this unit. These pulses are used to control the vertical sense-write drivers and the punch thyratrons of FIGURES 12 through 12c, inclusive.

The Product storage matrix read drivers of FIGURES 11a to 11k are controlled by the Product Read-to-Punch Control unit of FIGURES 11–1 and 11–2. Column emitter impulses to the terminals PR–1 through PR–12, inclusive, close the switches (SW) under the control thereof to condition AND gates. These AND gates provide an output therefrom upon the simultaneous occurrence of A pulses to provide signals to fire the read drivers for the associated positions in the Product Storage Read-Write unit of FIGURES 11a to 11k, inclusive. The outputs of the switches from these units are also fed to OR gate 69 in FIGURE 11–3 of the Vertical Sense-Write Control. It will be noted that in the PR–1 channel the output of switch 81 feeds AND gate 82 which is conditioned by pulse (MPC) from the Multiply On-Off Control of FIGURE 8a. The output of AND gate 82 is connected to OR gate 69 of FIGURE 11–3.

(15) *Reset Product Storage-to-Zero Unit (FIGURE 11–4)*

This unit functions to provide program pulses to the Product Storage Read-Write unit of FIGURES 11a through 11k and the Vertical Sense-Write unit of FIGURE 12 to reset the Product Storage Matrix of FIGURE 11 to 0. The AND gates 83 and 84 are provided with program pulses to generate pulses A1 (S–1) and B1 (S–1).

(16) *Add Matrix Read Control and Multiply On-Off Control (FIGURE 8a)*

OR gate 85 is provided with program pulses to fire the read driver 86 to provide a read pulse R to the Add Matrix of FIGURE 8.

The column emitter impulse following the last column of the multiplicand applies an impulse to the Multiply On terminal which closes switch 87 to set trigger 88. In the set condition the set output of the trigger provides a Multiply On impulse. In the reset condition of the trigger the reset output provides a multiplication complete or MPC pulse. The trigger is reset by a Multiply Off impulse from FIGURE 3.

(17) *Vertical Sense-Write and Product Punch Unit (FIGURES 12 Through 12c)*

This group of circuits provides means to sense and temporarily store the outputs on the vertical sense lines from the Add Matrix, Carry Propagation Storage unit and Product Storage Matrix. The signals on the vertical sense lines from these units are applied, for example, as shown in the 0 channel, to amplifier 89. The output from amplifier 89 sets 0 vertical storage trigger 90 which in the set condition conditions AND gate 91. This AND gate 91 provides an output therefrom, upon the simultaneous application of pulse V, to OR gate 92. The output of the OR gate fires the write driver 93 to provide a W/2 pulse to the 0 vertical write line of the Product Storage Matrix of FIGURE 11. OR gate 92 also fires write driver 93 upon the application of a program pulse B1 (S–1) thereto. Trigger 90 is reset by a C pulse connected to its reset input. The set output from trigger 90 together with pulse B (PRO) conditions AND gate 94 to fire the thyratron 95. The firing of the thyratron 95 controls a magnet which causes the card on which the product is to be punched to be punched in the units column thereof in a position in said column identified with an appropriate decimal value for the digit.

The other channels are quite similar except for the lack of an OR gate similar to OR gate 92. OR gate 92 is provided in the 0 channel to originally write a 0 in all cores in all product positions of the product storage matrix. In addition, the AND gates in a position occupied by AND gate 91 in the 0 channel are conditioned by W pulses instead of V pulses.

Thus, any digit read out of the Add Matrix, Carry Propagation Storage unit or Product Storage Matrix may be written or rewritten into any of the same units. In addition, the 0 write driver 93 may be impulsed by a specific program pulse B1 (S–1) to write 0's into all of the product storage positions of the Product Storage Matrix of FIGURE 11. The outputs of the triggers may also be used in conjunction with specific program pulses to impulse the punch control thyratrons to effect punching of digits read out of the product storage onto the card on which will appear the final product of the multiplication operation.

(18) Left-Hand and Right-Hand Component Read Control (FIGURE 6a)

The application of program pulses to read drivers 96 and 97 fire these drivers to provide R pulses to the respective Multiplier Right-Hand Component Matrix of FIGURE 6 and the Multiplier Left-Hand Component Matrix of FIGURE 5.

(19) Program Control (FIGURES 3 Through 3k, Inclusive)

Figure 3A:
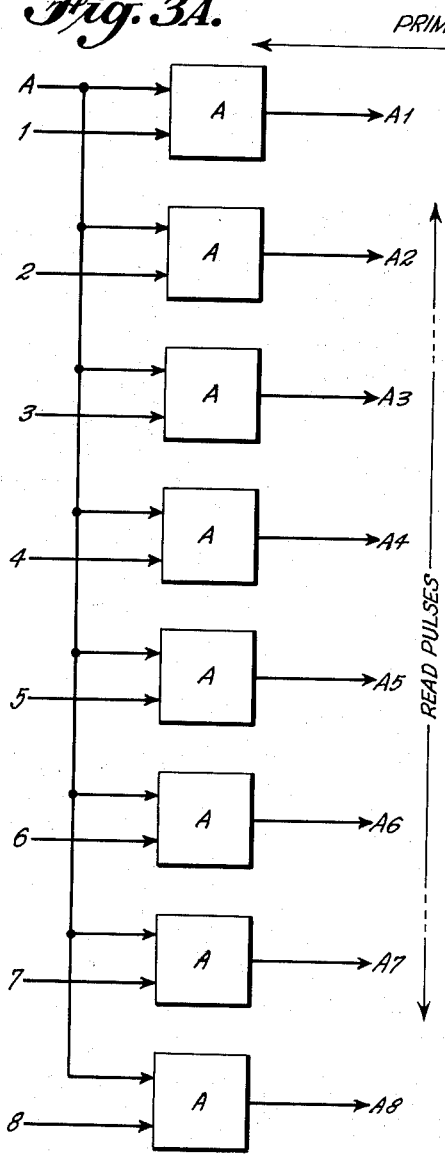
FIGURES 3a and 3b are diagrammatic views showing the production of the read and write pulses for primary operation selection.
Figure 3B:
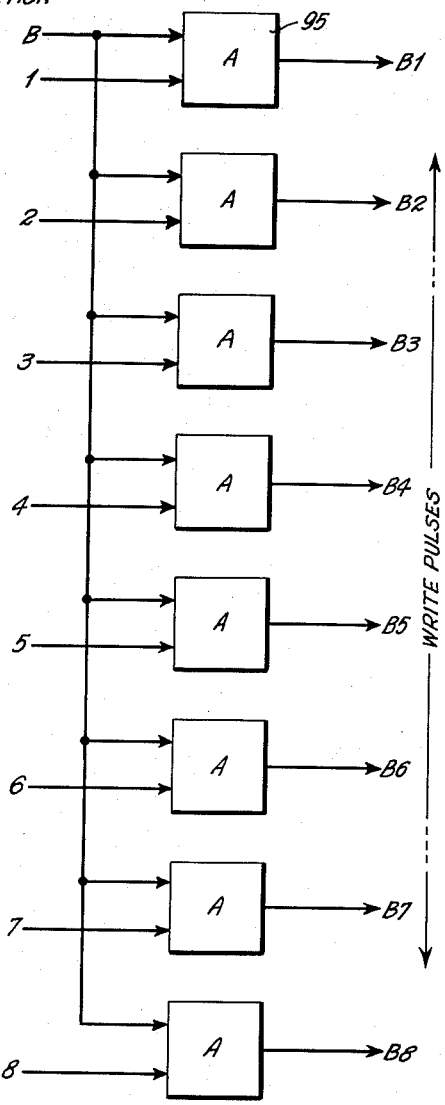
Figure 3C:
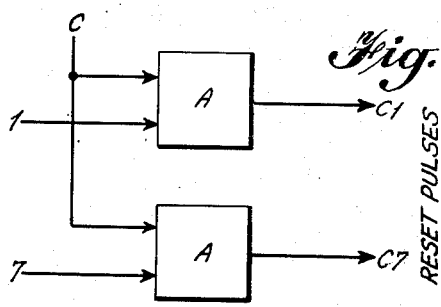
FIGURE 3c is a diagrammatic view showing the production of the reset pulses.

This unit consists of means such as a multivibrator for producing continuous clock impulses (this particular means is not shown). It provides pulses to the AND gate 98, the output of which controls the operation of three ring counters. The first ring counter 99 is a three-stage ring which provides the basic C pulse (reset), A pulse (read), and B pulse (write). These three pulses are required in each of the eight major steps for the multiplication operation. The outputs of the three stages of this ring, namely, the C, A, and B pulses, are combined as shown in FIGURES 3a, 3b, and 3c to provide the pulses for primary operation selection. They are combined in AND gates with the outputs from the stages of the second ring counter 100 which is an eight-stage ring. The various stage outputs from the counter 100 are identified as pulses 1 through 8, inclusive.

The combination of the various stage outputs from the two six-stage ring counters 101 and 102 constitute the program pulses for the secondary operation selection and as shown in FIGURES 3d through 3i, inclusive, provide pulses identified as S–1 through S–36, inclusive.

As shown in FIGURES 3j and 3k, pulses identified as P2 through P10, inclusive, are provided at the outputs of their associated OR gates which in turn are controlled by the secondary operation selection pulses S–1 through S–5, inclusive.

The AND gate 98 controlling the entry of clock pulses to counter 99 is conditioned by the output of OR gate 103. To this OR gate are fed (1) MCR read in impulse from the set output of the MCR trigger 22 shown in FIGURE 4e (2) Multiply On impulse from trigger 88 in the Multiply On-Off Control unit of FIGURE 8a and (3) PRO pulse obtained from trigger 68 in the Horizontal Sense-Write Control unit shown in FIGURE 11–3. The application of any of these impulses to OR gate 103 will condition AND gate 98 to provide clock pulses to counter 99 to advance the count therein. The conditioning of AND gate 104 by Multiply On impulse permits counter 100 to advance its count therein at the same time that counter 99 provides a C pulse. The Multiply On impulse is also applied to AND gate 105, AND gate 106, and AND gate 107.

It can be seen from the above that the counter 99 provides the C, A and B pulses required in each of the eight major operations for the multiplication process. The counter 100 serves to identify each of the eight major operations involved. The two six-stage rings 101 and 102 in combination with each other serve to identify each of the 36 individual steps required to complete the multiplication of a six-digit multiplicand and a six-digit multiplier. Each of these six-stage rings are subordinate to the one preceding it and are not advanced until the preceding ring has completed its full cycle, and then only if the Multiply On impulse from FIGURE 8a has been applied to the AND gates 104, 106, and 107. Additionally, the three-stage ring 99 is controlled for use in multiplicand read-in and product read-out without use of the succeeding rings.

It can be seen from an examination of FIGURE 1, FIGURES 5b and 5c, and FIGURES 4a and 4b that the pulses S–1 to S–36, inclusive, control the selection of multiplicand and multiplier digits. Turning, for instance, to FIGURE 5b it can be seen that the digit of the multiplier in multiplier position 1 is selected for the first, second, fourth, seventh, eleventh, and sixteenth steps. This coincides with the showing in FIGURE 1. Multiplier position 2 of the multiplier is selected for steps 3, 5, 8, 12, 17, and 22. With relation to multiplicand selection, attention is directed to FIGURE 4a. The multiplicand position 1 digit is selected during steps 1, 3, 6, 10, 15, and 21. The multiplicand position 2 is selected during steps 2, 5, 9, 14, 20, and 26. This selection, as can be seen from these figures, is accomplished by grouping the proper S pulses associated with the particular steps into the circuit which energizes the particular write driver involved. Of course, in connection with the multiplicand selection of FIGURES 4a and 4b, these S pulses also control not only the selection of the multiplicand digit for multiplication in any particular step but also the rewriting of the digit back into the multiplicand storage matrix of FIGURE 4.

DESCRIPTION OF THE OPERATION

For the purpose of illustrating the sequential operation of the various units of the multiplier, let it be assumed that the multiplicand is 987654 and the multiplier is 123456. The multiplier is to be manually set up in the Storage Keyboard of FIGURE 5a and the card containing the multiplicand is fed into the machine read station and positioned to read first column 37. It will be assumed that the multiplicand occurs in card columns 32 to 37, inclusive. The twelve significant ordinal positions of the product are to be punched on a card in columns 20 to 31, inclusive, which is the card fed to the punch station of the machine following the card containing the multiplicand. The multiplication proceeds in the following manner:

(A) The multiplier is manually set up on the Storage Keyboard of FIGURE 5a.

(B) The multiplicand is read from the card and stored in the Multiplicand Storage Matrix of FIGURE 4.

(C) Multiplication occurs in 36 steps, one for multiplication of each digit of the multiplicand by each digit of the multiplier as shown in FIGURE 1. Each of the individual multiplications proceeds in the following 8 major operations:

(1) The selected positions of the multiplier and multiplicand are simultaneously read. This produces coincident currents in the left-hand and right-hand component matrices of FIGURE 5 and FIGURE 6, switching cores corresponding to the left-hand and right-hand component digits.

(2) The right-hand matrix and the selected position of the Product Storage Matrix of FIGURE 11 are simultaneously read. This produces coincident currents in the Add Matrix of FIGURE 8, switching the core corresponding to the sum of the two digits.

(3) The next left-hand position of the product storage matrix and carry propagation $N_2$ and $N_{2+1}$ storage are simultaneously impulsed. This produces coincident currents, switching cores corresponding to the product digit and that digit plus 1 in the $N_2$ and $N_{2+1}$ storage, respectively.

(4) The next successive left-hand position of product storage is similarly stored in $N_3$ and $N_{3+1}$ storage.

(5) The sum in the Add Matrix is read out into the selected position of product storage (see step 2).

(6) The digit in $N_2$ or $N_{2+1}$ storage, depending upon whether the sum produced in step 2 also produced a carry, and the digit in the left-hand components matrix are simultaneously read. This produces coincident currents in the Add Matrix, switching the core corresponding to the sum of the two digits.

(7) The sum in the Add Matrix is read out into the next left-hand position of product storage matrix (see step 3).

(8) The digit in $N_3$ or $N_{3+1}$ storage, depending upon whether the sum produced in step 6 also produced a carry, is read into the next successive left-hand position of the product storage matrix (see step 2).

(D) The product is read out of the product storage matrix to the punch column by column.

The above eight operations are those which are employed in developing the product in the Product Storage Matrix of FIGURE 11.

STORAGE OF THE MULTIPLICAND IN THE MULTIPLICAND STORAGE MATRIX

An impulse from the column emitter position 37 of the card containing the multiplicand is provided at terminal MC-1 of the Multiplicand Read-in Control of FIGURE 4c. This closes switch 18 to condition AND gates 19 and 20. The output of switch 18 also provides an output from OR gate 21 of FIGURE 4e to set trigger 22. At the time of application of the impulse from column emitter 37, an impulse is applied to sensing pin contact No. 4 from column 37 indicating the 4 punched in said column. This impulse is applied to the switch 109 in the Horizontal Sense-Write Control of FIGURE 4f to close said switch and apply a conditioning voltage to AND gate 110. It can be seen that the setting of trigger 22 provides an MCR read-in control impulse to OR gate 103 to condition AND gate 98. The next clock pulse then passes through AND gate 98 to provide C pulse from counter 99. This first C pulse has no specific function. However, an A pulse immediately follows the C pulse and when applied to AND gate 19 in FIGURE 4c provides a signal to OR gate 14 in the Multiplicand Selection unit of FIGURE 4a. This fires read driver 16 to provide an R pulse to the cores in the MC position—1 column of the Multiplicand Storage Matrix of FIGURE 4. This returns all of these cores in this column to their normal state. The output of any core in this column which might have been set up would follow its horizontal sense line to its horizontal sense amplifier in FIGURES 7, 7a or 7b and set the corresponding storage trigger. The output of this trigger will however be ignored as the required conditioning B pulse will not occur. Therefore, the MC position—1 cores of the multiplicand storage matrix are cleared.

A B pulse immediately follows the A pulse. This B pulse conditions AND gate 20 to provide a signal to OR gate 15 which then fires the read driver 17 to supply a W/2 pulse to the MC position—1 cores of the Multiplicand Storage Matrix of FIGURE 4. Simultaneously, this B pulse is fed to AND gate 23 which is conditioned by the MCR trigger 22 to provide a B (MCR) pulse. This B (MCR) pulse is applied to all of the AND gates in the Horizontal Sense-Write Control of FIGURES 4f and 4g and in combination with the output from switch 109 will provide a 4B (MCR) pulse. This pulse is fed to OR gate 111 in FIGURE 7a to fire the write driver 112. This provides a W/2 pulse to the 4 horizontal write line which passes through the Add Matrix of FIGURE 8, the Multiplier Right-Hand Components Matrix of FIGURE 6, the Multiplier Left-Hand Components Matrix of FIGURE 5 to the Multiplicand Storage Matrix of FIGURE 4. It can be seen then that simultaneous W/2 pulses occur to switch the No. 4 core in the multiplicand storage matrix in the multiplicand position—1 column.

The next clock impulse not only produces a C pulse but also an MCR reset pulse. This MCR reset pulse is fed to the MCR trigger 22 to reset said trigger. With this trigger reset OR gate 103 is blocked and the following clock impulse cannot pass through AND gate 98 to advance ring 99. The C pulse resets any of the storage triggers in the Horizontal Sense-Write unit of FIGURES 7, 7a, and 7b which may have been set in clearing the MC position—1 column of cores in the multiplicand storage matrix.

Upon completion of the card read machine cycle including the pulses C, A, B and escapement of the card to column 36 wherein is stored a 5 in the second significant ordinal position of the multiplicand, the preceding steps are repeated to read this 5 into the multiplicand position—2 column of cores in the multiplicand storage matrix of FIGURE 4. This process is repeated until all digits of the multiplicand have been read from the card and stored in this matrix. Upon completion of the storage of the multiplicand the card will escape to column 31. Now the column emitter position will be plugged to the Multiply On terminal of FIGURE 8a. This will close switch 87 to set trigger 88 to supply a Multiply On impulse to OR gate 103 to permit AND gate 98 to pass succeeding clock impulses to the ring counter 99. The Multiply On impulse is also fed to AND gates 104, 105, 106, and 107 to make immediately available pulses 1, $a'$ and $a$. The operations which take place with the occurrence of each succeeding impulse will be as follows:

*Operation 1.*—It will be recalled that in operation 1 the selected positions of the multiplier and multiplicand are simultaneously read. This produces coincident currents in the multiplier left-hand and right-hand matrices, switching cores corresponding to the left-hand and right-hand component digits of the partial product. This is accomplished as follows:

The C pulse is applied to all of the vertical storage triggers of FIGURES 12 through 12c, inclusive, to reset these triggers and to the horizontal storage triggers of FIGURES 7, 7a, and 7b to reset these triggers. Pulse C1 is fed to OR gate 61 in the Carry Propagation Read-Write Control unit of FIGURE 10 to reset NDC trigger 56 and DC trigger 60. Pulse A1 is fed to AND gate 12 in the Multiplicand Read-Write unit of FIGURES 4a and 4b where it is combined with pulse S-1 to provide an input to OR gate 14. The output from OR gate 14 fires the read driver 16 to provide an R pulse to the MC position—1 column of cores in the Multiplicand Storage Matrix of FIGURE 4. This reads out a 4 from this matrix. The impulse on the 4 horizontal sense line passes through the left-hand components matrix 27, the right-hand components matrix 39, to the amplifier 43 of the Horizontal Sense-Write unit of FIGURES 7 to 7b. The output of the amplifier sets 4 horizontal storage trigger 44. In addition, the A1 pulse is fed to OR gates 58, 113, 114, and 115 in the Carry Propagation Read-Write Control unit of FIGURE 10. This fires the associated read drivers to clear $N_3$, $N_2$, $N_{3+1}$, and $N_{2+1}$ rows of cores in the Carry Propagation Storage unit of FIGURE 9. Pulse A1 is combined with pulse S-1 in AND gate 83 of the Reset Product Storage to zero unit shown in FIGURE 11-4 to provide pulse A1 (S-1). This pulse is applied to all of the OR gates in the Product Storage Read-Write unit of FIGURES 11a through 11k to fire the associated drivers to provide R pulses to all the product position row of cores in the Product Storage Matrix of FIGURE 11 to clear all of these positions.

The B1 pulse in combination with S-1 pulse from OR gate 11 in the Multiplicand Read-Write unit of FIGURES 4a and 4b provides an output from AND gate 13 to OR gate 15 to fire write driver 17. This provides a W/2 current impulse to all of the cores in the MC position—1 column of cores in the Multiplicand Storage Matrix of FIGURE 4. The S-1 pulse through OR gate 37 in the Multiplier Selection and Write unit of FIGURES 5b and 5c combines in AND gate 38 with pulse B1 to fire writer driver 36. This provides a W/2 pulse to the multiplier position—1 conducting bar 30 of the Storage Keyboard of FIGURE 5a. As shown in FIGURE 5a, the multiplier 123456 is stored thereon by depressing the respective keys to contact the associated conducting bars. Consequently, the W/2 pulse is fed to the 6 vertical write line which connects to the 6 vertical write line in the left-hand components matrix.

The B ($\overline{MCR}$) pulse is fed to AND gate 116 in the

Horizontal Sense-Write unit of FIGURES 7 to 7b. Recalling that trigger 117 has been set by the readout of a 4 from the multiplicand storage matrix 10, the combination of the set output from this trigger with the B ($\overline{MCR}$) together with an impulse $\overline{9}$ from the unoperated 9 storage trigger 118, conditions AND gate 116 to apply a signal to OR gate 111, the output of which fires the write driver 112. This applies a W/2 pulse to the 4 horizontal write line passing through the Add Matrix of FIGURE 8, the right-hand and left-hand components matrices of FIGURES 6 and 5 to the Multiplicand Storage Matrix of FIGURE 4. The coincidence of W/2 pulses rewrites a 4 in the Multiplicand Storage Matrix and switches one core in the left-hand components matrix 27 and one in the right-hand components matrix 39. The core switched in matrix 27 will be indicative of a 2 and the core switched in the right-hand components matrix 39 will be indicative of a 4.

In the Reset Product Storage to zero unit of FIGURE 11–4, B1 combines with S–1 in AND gate 84 to provide pulse B1 (S–1). This pulse is applied to all of the OR gates in the read driver circuits of the Product Storage Read-Write unit of FIGURES 11a to 11k to fire their associated read drivers to provide a W/2 pulse through all of the horizontal write lines of the Product Storage Matrix of FIGURE 11. In addition, the B1 (S–1) pulse is applied to OR gate 92 in the Vertical Sense-Write and Product Punch unit of FIGURES 12 to 12c. This fires read driver 98 to provide a W/2 pulse to the 0 vertical write line through the product storage matrix carry propagation unit and the add matrix. This provides coincident W/2 pulses in the 0 position in each of the horizontal rows of cores. Also coincident W/2 pulses switch a core in the Add Matrix of FIGURE 8. This core in the Add Matrix indicates the storage of a 4 therein.

In operation 1 then, the units position of the multiplier and multiplicand have been extended to provide a partial product with components stored in left-hand and right-hand matrices, and the multiplicand units digit has been rewritten in its storage matrix for further use. Also the carry propagation storage has been cleared and the product storage reset to 0. It should be noted that any extraneous output of these two units in clearing, although they will set vertical sense storage triggers in FIGURES 12 through 12c, they will be suppressed due to the absence of V and W pulses to combine with the trigger output. It should also be noted that a superfluous digit has been written in the Add Matrix, namely, a 4. It is suppressed during the following operation in the same manner.

*Operation 2.*—It will be recalled that in operation 2 the right-hand matrix and the selected position of the product storage matrix are simultaneously read.

At this time a 2 is stored in the left-hand components matrix and a 4 in the right-hand components matrix. All product positions in the product storage matrix are 0. At this time the first three significant digits corresponding to product positions 1, 2, and 3 of the product are under development. The least significant digit is identified as $N_2$, the next most significant digit by $N_3$, and the most significant digit under development by $N_4$.

The next C pulse resets the horizontal and vertical storage triggers. The A2 pulse follows and is applied to OR gate 85 in the Add Matrix Read Control unit of FIGURE 8a. This fires read driver 86 to apply an R pulse to read line 48 of the Add Matrix. The 4 stored therein is read out and provides a signal on the 4 vertical sense line which is fed to amplifier 120 in the Vertical Sense-Write and Product Punch unit of FIGURES 12 to 12c. The output from this amplifier sets 4 vertical storage trigger 121. Pulse A2 is also fed to read driver 96 in the Right Hand Read unit of FIGURE 6a to provide an R pulse to read line 42 of the right-hand components matrix 39. The 4 stored therein is sensed on 4 horizontal sense line and is fed to 4 horizontal sense amplifier 125 in the Horizontal Sense-Write unit of FIGURES 7 to 7b. This sets 4 horizontal storage trigger 117. Pulse A2 is combined with pulse S1 in AND gate 64 of the Product Storage Read-Write unit of FIGURES 11a to 11k, inclusive, to provide an output therefrom to OR gate 65. The output from OR gate 65 fires read driver 66 to provide an R pulse to the product position 1 row of cores in the Product Storage Matrix of FIGURE 11. This reads a 0 out of this row on the 0 vertical sense line and this is applied to 0 vertical sense amplifier 89 in the Vertical Sense-Write and Product Punch unit of FIGURES 12 to 12c. The output of the amplifier 89 sets 0 vertical storage trigger 90.

Pulse B ($\overline{MCR}$) is fed to AND gate 116 in the Horizontal Sense-Write unit of FIGURES 7 to 7b where it combines with the set output from trigger 117 and pulse $\overline{9}$ to fire write driver 112. This provides a W/2 pulse on 4 horizontal write line through the Add Matrix, right and left-hand components matrix and the multiplicand storage matrix.

Pulse V combines with the set output of 0 vertical storage trigger 90 in AND gate 91 to fire the write driver 93. This provides a W/2 pulse to the 0 vertical write line in the product storage matrix, the carry propagation unit and the Add Matrix. Coincidence of W/2 pulses in the Add Matrix switches the core representing the sum of the vertical and horizontal digits, that is, the 4 stored in the Horizontal Sense-Write unit of FIGURES 7a to 7b indicative of the readout from the right-hand component matrix and a 0 from the Vertical Sense-Write and Product Punch unit of FIGURES 12 to 12c indicative of a 0 in product position 1 of the Product Storage Matrix of FIGURE 11.

*Operation 3.*—It will be recalled that in this third operation the next left-hand position of the product storage and carry propagation $N_2$ and $N_{2+1}$ storage are simultaneously impulsed. This produces coincident currents, switching cores corresponding to the product digit and that digit plus 1 in $N_2$ and $N_{2+1}$ storage respectively.

Figure 11K:
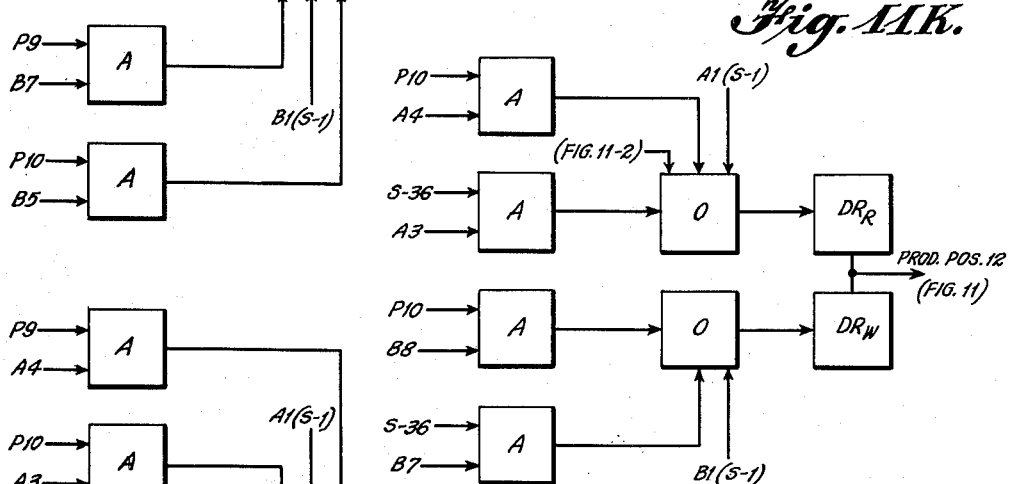
Figure 11J:
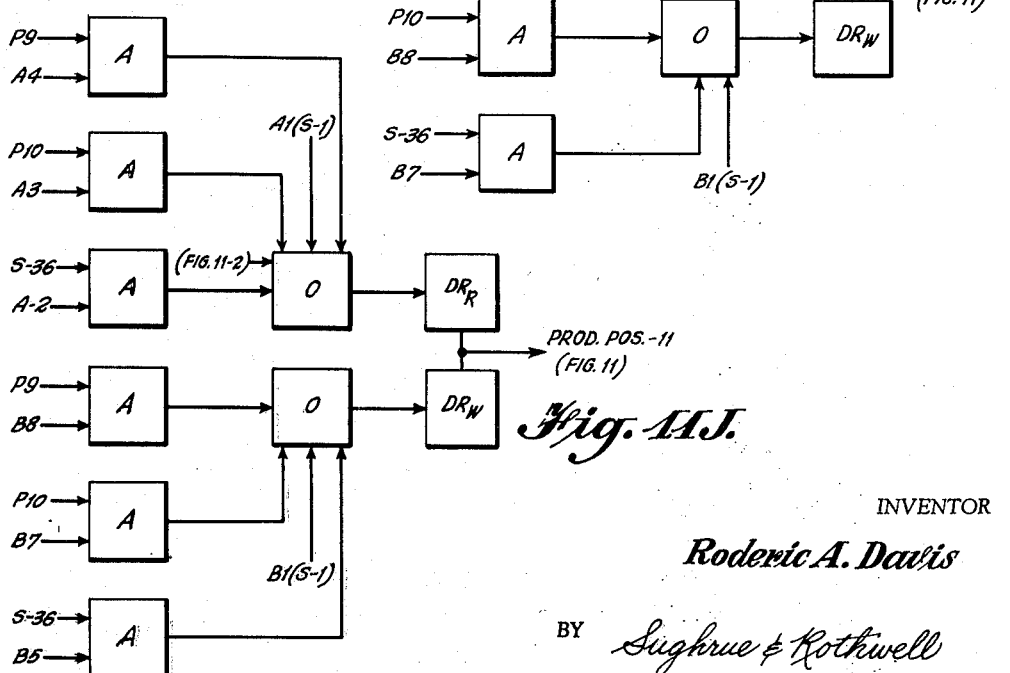

A 3 pulse follows and is combined with pulse S–1 in AND gate 130 of the Product Storage Read-Write unit of FIGURES 11 to 11k to fire the red driver 132. This provides an R pulse to the product position 2 row of cores in the product storage matrix. This reads out a 0 from this matrix. The read-out is sensed on the 0 vertical sense line to set the corresponding vertical storage trigger. A B3 pulse then follows. This is fed to the write driver 63 in the Carry Propagation unit of FIGURE 10. This provides a W/2 pulse to the $N_2$ and $N_{2+1}$ row of cores. A V pulse is combined with the set output of the 0 vertical storage trigger unit to fire the 0 write driver associated therewith. This provides a W/2 current impulse on the 0 vertical write line through the product storage matrix, the carry propagation unit and the Add Matrix. Coincident W/2 pulses in the carry propagation unit switches the 0 core in the $N_2$ storage and the 1 core in the $N_{2+1}$ storage. In this operation the tens position of product storage, that is, the product storage position No. 2 has been read out and stored in the carry propagation storage in two forms, as read and raised by 1.

*Operation 4.*—In this operation the next successive left-hand position of product storage is similarly stored in $N_3$ and $N_{3+1}$ storage.

The next C pulse resets all the horizontal and vertical storage triggers as before. The A4 pulse which follows is combined with the S–1 pulse and fires the read drive circuit for product position 3 in the Product Storage Matrix of FIGURE 11. A 0 is read out and is stored in the 0 vertical storage trigger.

A B4 pulse follows and it fires the $N_3$ and $N_{3+1}$ write drivers in the carry propagation unit. This provides a W/2 pulse through all of the $N_3$ and $N_{3+1}$ cores. A V pulse is combined with the output of the 0 vertical storage trigger to fire the 0 write driver and provide a W/2 current pulse on the 0 vertical write line through the product storage unit, the carry propagation unit and the Add Matrix. Coincident W/2 pulses in the carry propagation unit switches the 0 core in the $N_3$ storage and the 1 core in the $N_{3+1}$ storage. In this operation, the hundreds position of product storage has been read-out and stored in carry propagation storage in two forms, as read-out and raised by 1.

*Operation 5.*—In this operation the sum in the adder is read out into the selected position of product storage.

The next C pulse resets all the horizontal and vertical storage triggers as before. The A5 pulse which follows fires the read driver for the add matrix sending an R pulse through all the cores therein to read out the 4 stored therein. The output sensed on 4 vertical sense line sets its associated vertical storage trigger. The B5 pulse which follows is combined with S-1 pulse and fires the write driver associated with product position 1 of the product storage matrix and provides a W/2 pulse through all the cores in that product position. The W pulse combines with the output of the 4 vertical storage trigger and fires the write driver associated therewith. The output on the 4 vertical write line provides a W/2 pulse through the the product storage matrix, the carry propagation unit and the Add Matrix. Coincident W/2 pulses in the product position 1 switch the 4 core. Since there was no carry resulting from the production of the 4 in the Add Matrix, the read out from the Add Matrix also impulses the NDC line switching the NDC storage trigger. In this operation the sum of the right-hand component of the first partial product and the units position of the product storage has been transferred from the adder to the product position—1 in the product storage matrix and an indication of no carry has been recognized and stored.

*Operation 6.*—In this operation, the digit in the $N_2$ or $N_{2+1}$ storage, depending upon whether the sum produced in operation 2 also produces a carry and the left-hand matrix are simultaneously read. This produces coincident currents in the Add Matrix switching the core corresponding to the sum of the two digits.

The next C pulse again resets all the horizontal and vertical storage triggers as before. The A6 pulse which follows fires the left-hand component read driver and output is sensed on the 2 horizontal sense line to set the associated horizontal storage trigger. A6 pulse is combined with the output of NDC storage trigger to fire the $N_2$ read driver which reads out the 0 stored in the $N_2$ cores and provides a signal to the 0 vertical sense line. This sets the vertical storage trigger associated therewith.

Pulse B ($\overline{MCR}$) is combined with the output of the 2 horizontal storage trigger and the unoperated output of 7 the horizontal storage trigger indicated as impulse 7 to fire the 2 horizontal write driver. The output from this driver provides a W/2 pulse on the 2 horizontal write line through the add matrix, the right-hand component and the left-hand component matrices and the multiplicand storage matrix. The V pulse in combination with the output of the 0 vertical storage trigger fires the associated write driver sending a W/2 pulse on the 0 vertical write line through the product storage matrix, the carry propagation unit and the add matrix. Coincident W/2 pulses in the add matrix switch a core representing the sum of the vertical and horizontal digits. In this operation, the left-hand component of the first partial product has been added to the 0 from the tens position of the cleared product storage unit.

*Operation 7.*—The sum in the adder is read out into the next left-hand position of product storage.

The next C pulse again resets all the horizontal and vertical storage triggers as before. The C7 pulse is fed to the OR gate 61 in the Carry Propagation Read-Write Control unit of FIGURE 10 to reset the NDC trigger 56. The A7 pulse follows and it fires the read driver for the add matrix providing an R pulse through all the cores in the adder to read out the 2 stored therein. The output on the 2 vertical sense line sets its associated vertical storage trigger. The B7 pulse which follows is combined with S-1 pulse and fires the write driver associated with product position 2 of the Product Storage Matrix of FIGURE 11. This provides a W/2 pulse through all the cores in the product position 2 row. The W pulse combines with the output of 2 vertical storage trigger to fire the associated write driver. The output on the 2 vertical write line sends a W/2 pulse through the product storage matrix, the carry propagation unit and the add matrix. Coincident W/2 pulses in product position 2 switches the 2 core. Since there was no carry resulting from the production of the 2 in the add matrix, the read-out also produces an impulse on the NDC line which switches the NDC trigger. In this operation, the sum of the left-hand component of the first partial product and the tens position of the product storage has been transferred from the add matrix to product position 2 in the Product Storage Matrix of FIGURE 11 and the indication of no carry has been recognized and stored.

*Operation 8.*—The digit in the $N_3$ or $N_{3+1}$ storage, depending upon whether the sum produced in operation 6 also produces a carry, is read into the next successive left-hand position of the Product Storage Matrix of FIGURE 11.

The next C pulse resets all the horizontal and vertical storage triggers as before. The A8 pulse which follows is combined with the output of the NDC storage trigger and fires the $N_3$ read driver which sends an R pulse through all the cores of $N_3$ storage reading out the 0 stored therein. The output on the 0 vertical sense line produced thereby fires its associated vertical storage trigger. The B8 pulse which follows is combined with the S-1 pulse to fire the write driver associated with product position 3 of the product storage matrix which sends a W/2 pulse through all the cores in product position 3 of this matrix. The V pulse is combined with the output of the 0 vertical storage trigger and fires the write driver associated therewith, sending a W/2 pulse on the 0 vertical write line through the product storage matrix, the carry propagation unit and the add matrix. Coincident W/2 pulses in product position 3 of the product storage matrix switches the 0 core. In this operation, the hundreds position of the product storage has been exposed to possible addition of a carry and has been referred to product position—3 storage.

In these eight operations as outlined above, the product of the units digit 6 of the multiplier and the units digit 4 of the multiplicand have been produced and this product (024) stored in the correct positions of the product storage matrix, all under control of step 1 (S-1) pulse. All succeeding operations (to and including the thirty-sixth multiplication step) follow the exact pattern of these eight operations with the difference that the positions of the multiplier, multiplicand and product storage operated with and on will be governed by the S pulse (S-2, S-3, etc.) controlling that step. At the end of operation 8, step 36, the next clock impulse to the ring 99 in program control will produce a Multiply Off impulse from the last stage of ring 102. This Multiply Off impulse is fed to the reset input of trigger 88 in the Multiply On-Off Control of FIGURE 8a. This provides an MPC impulse from the reset output of this trigger.

PRODUCT READ-OUT

To read-out the product stored in the 12 product positions of the product storage matrix, the impulse from column emitter position 31 of the card containing the multiplicand is connected to terminal PR-1 in the Product Read-to-Punch Control unit of FIGURE 11-1. This closes switch 81 and in combination with the MPC input to AND gate 82 provides a pulse to OR gate 69 in the Vertical Sense-Write Control unit of FIGURE 11-3.

The output from OR gate 69 sets the PRO trigger 68. This provides a PRO pulse to the OR gate 103 in program control which permits AND gate 98 to pass further clock pulses to ring 99. The A pulse which follows produces the following action: The A pulse is combined with the impulse to terminal PR–1 in the Product Read-to-Punch Control of FIGURE 11–1 to fire the read driver 66 for product position 1 of the product storage matrix. The resulting output of this R pulse to product position 1 provides a signal to 4 vertical sense line to fire its associated vertical storage trigger. The B pulse which follows is combined with the output of the PRO trigger to provide pulse B (PRO). This B (PRO) pulse is combined with the output of the 0 vertical storage trigger in AND gate 94 of the Vertical Sense-Write and Product Punch unit of FIGURES 12 to 12c to fire thyratron 95. The output of this thyratron energizes the 4 magnet in the units positions (column 31) of the product card, provides a perforation in said position and causes escapement to column 30 of the product card. The next clock impulse produces a C impulse which resets the vertical storage triggers and resets the PRO trigger. Upon completion of the machine punch cycle and escapement of the card to column 30 the preceding steps are repeated to punch a 2 into column 30. This process is repeated until all positions of the product storage matrix have been read out and punched. Upon completion of the punching of product position 12 of the product storage matrix, the entire circuit becomes inactive.

As has been described above, the units digit of the multiplier and the units digit of the multiplicand have been multiplied to provide a partial product. This partial product is stored in product positions 1, 2, and 3 in the product storage matrix. As shown in FIGURE 1, the next multiplication operation involves the multiplication of the units digit of the multiplier and the tens digit of the multiplicand. These digits are 6 and 5, respectively. The partial product resulting from the multiplication of these two digits is 30. A 0 is stored in the right-hand components matrix and a 3 in the left-hand components matrix. The product positions of the product now under development are product positions 4, 3, and 2. The units digit in product position 1 has already been fully developed. Consequently, the least significant product position under development at this time is product position 2. In this position is stored a 2 in the product storage matrix. This 2 is added to the 0 stored in the right-hand components matrix to provide a 2 in the add matrix. The add matrix is then read and the 2 is stored in the least significant position in product storage currently under development, which is product position 2. At the time of reading of the add matrix, there is an indication of no carry. The next most significant position under development is product position 3 wherein is stored a 0. This 0 is entered into the carry propagation storage as a 0 in the $N_2$ storage and a 1 in the $N_{2+1}$ storage. The most significant product position under development at this time is product position 4. The 0 stored in this position is stored as a 0 in $N_3$ storage and as a 1 in $N_{3+1}$ storage. Since there was no carry, the $N_2$ storage of a 0 is added to the left-hand component thereby storing a 3 in the add matrix. The add matrix is then read and stored in product position 3. The result of reading the add matrix indicates another no carry. The carry propagation storage is then read and since there was a no carry, the $N_3$ 0 is read into the product position 4 of product storage. The new partial product is then 032.

As a result of the multiplication of the tens digit of the multiplier and the units digit of the multiplicand, there is produced a partial product equal to 20. The addition of the 20 to the developed product in product storage provides a new developed product 052. This is continued until all of the twelve significant positions of the product have been developed.

The selection of the digit of the multiplier and the digit of the multiplicand is made by the program control in such a manner that only three significant positions of the product are under development at any one time. The writing and reading of the product positions in product storage is determined by program control so that the appropriate three significant positions of the product are simultaneously under development.

What has been described are various embodiments of the present invention. Other embodiments obvious to those skilled in the art from the teachings herein are contemplated to be within the spirit and scope of the following claims.

What is claimed is:

1. Apparatus for multiplying two multidigit numbers, a multiplicand and a multiplier, to provide a product thereof comprising means for storing said multiplicand, means for storing said multiplier, means for selectively multiplying pairs of digits of said multiplicand and multiplier in a sequence of groups, each group composed of a sequence of digit multiplications of all pairs of digits of said multiplier and multiplicand which will produce partial products whose digits are in the same ordinal positions of said product, the sequence of said groups being selected so that each of the partial products comprising a group contains a larger order ordinal position than the partial products comprising the next preceding group and means to accumulate said partial products to provide said product.

2. Apparatus for multiplying two multidigit numbers, a multiplicand and a multiplier, to provide a product thereof comprising means for storing said multiplier, means for storing said multiplicand, means for selecting pairs of digits of said multiplier and multiplicand in a sequence of groups, each group composed of a sequence of digit selections of all pairs of digits of said multiplier and multiplicand which will produce partial products whose digits are in the same ordinal position of said product, the sequence of said groups being selected so that each of the partial products comprising a group contains a larger order ordinal position than the partial products comprising the next preceding group, digit multiplying means, means to transfer said selected pairs of digits to said multiplying means to multiply said digits to provide said partial products and means to accumulate said partial products to provide said product.

3. Apparatus as claimed in claim 2 wherein said selection means comprises means to generate a train of pulses, one pulse for each of said pairs of digits and means to simultaneously apply each of said pulses to said multiplier and multiplicand storage means to select a digit of said multiplier and a digit of said multiplicand.

4. Apparatus as claimed in claim 2 wherein said selection means comprises means to generate a train of pulses, one pulse for each of said pairs of digits, gating means associated with each of said digits in said multiplier and multiplicand storage means, means to apply each of said pulses simultaneously to a gating means associated with a digit in said multiplier storage means and a gating means associated with a digit in said multiplicand storage means whereby a digit of said multiplicand and a digit of said multiplier are selected for multiplication.

5. Apparatus as claimed in claim 2 wherein one of said multiplicand and multiplier storage means comprises a first magnetic core matrix and the other comprises a keyboard and said means to accumulate said partial products comprises a second magnetic core matrix.

6. Apparatus as claimed in claim 2 wherein said multiplying means comprises a left-hand component magnetic core matrix and a right-hand component magnetic core matrix, each of said component matrices having a plurality of X and Y writing means therefor, one of said writing means being associated with each possible digit values of said multiplicand digits and the other of said writing means being associated with each possible digit values of said multiplier digits whereby transfer of said selected pairs of digits to their associated writing means stores the left-hand component of their partial products in said left-hand component matrix and the right-hand component of their partial products in said right-hand component matrix.

7. Apparatus for multiplying two multidigit numbers, a multiplicand and a multiplier, to provide a product thereof comprising means for storing said multiplier, means for storing said multiplicand, means for selectively multiplying pairs of digits of said multiplicand and multiplier in a sequence of groups, each group composed of a sequence of digit multiplications of all pairs of digits of said multiplicand and multiplier which will produce partial products whose digits are in the same ordinal positions of said product, the sequence of said groups being selected so that each group of partial products comprising a group contains a larger order ordinal position than the partial products comprising the next preceding group, means for storing the left-hand component of a partial product, means for storing the right-hand component of a partial product, accumulated partial product storing means, means for first adding said right-hand component to the digit of said accumulated partial product corresponding to the ordinal position of said right-hand component, means for storing a first carry order of said first addition, means for selectively second adding said left-hand component to the digit of said accumulated partial product corresponding to the ordinal position of said left-hand component and said digit plus a carry as determined by said first carry order, means for storing a second carry order of said second addition, means for storing in said accumulated partial product storage means said digits of said additions in corresponding ordinal positions of said accumulated partial product and for storing therein said second carry order in the next higher ordinal position of said accumulated partial product.

8. In the addition of two multi-digit operands, a carry propagation storage device for selectively providing a carry and a no carry from one ordinal position of the sum thereof to the next that comprises means to simultaneously store a first value indicative of a first digit in said next ordinal position of one of said operands and a second value indicative of said first digit increased by said carry and means to select one of said values as a function of the value of said one ordinal position.

9. In the addition of two multi-digit operands, a carry propagation storage device for selectively providing a carry and a no carry from one ordinal position of the sum thereof to the next that comprises a core matrix, means to switch a first core in said matrix representing a first value indicative of a digit with no carry in said next ordinal position of one of said operands, means to switch a second core in said matrix representing a second value indicative of said digit increased by said carry and means to select one of said cores as a function of the value of said one ordinal position.

10. A magnetic core matrix for determining a dependent variable value in response to a pair of independent variable values comprising a plurality of magnetic cores arranged in a pair of sub-matrices, X and Y writing means for each of said independent values, odd X value writing means associated with individual rows of said pair of sub-matrices, and even X value writing means associated with rows of one of said sub-matrices, even Y value writing means associated with individual columns of said last-mentioned one of said sub-matrices, and odd Y value writing means associated with the individual columns of said pair of sub-matrices, an energizing means for driving selected X and Y value writing means whereby a single core assumes a state indicative of said dependent value when said independent values are both even and when said independent values are odd and even, respectively, and a pair of cores assume states indicative of said dependent value and a trivial value, respectively, when said values are both odd.

11. A magnetic core matrix as defined by claim 10 wherein said sub-matrices are each comprised of a 5 by 5 magnetic core array.

12. A device for determining a dependent variable value in response to a pair of independent variable values comprising a magnetic core matrix including a plurality of magnetic cores arranged in a pair of sub-matrices, X and Y writing means for each of said independent values, odd X value writing means associated with individual rows of said pair of sub-matrices, and even X value writing means associated with rows of one of said sub-matrices, even Y value writing means associated with individual columns of said last-mentioned one of said sub-matrices, and odd Y value writing means associated with the individual columns of said pair of sub-matrices, an energizing means for driving selected X and Y value writing means whereby a single core assumes a state indicative of said dependent value when said independent values are both even and when said independent values are odd and even, respectively, and a pair of cores assume states indicative of said dependent value and a trivial value, respectively, when said values are both odd and means associated with said matrix for inhibiting said trivial value.

13. Apparatus for multiplying two multi-digit numbers, a multiplicand and a multiplier, to provide a product thereof comprising means for storing said multiplicand, means for storing said multiplier, means to generate a train of pulses, one for each pair of digits of said multiplier and multiplicand, a digit selection means for selecting a digit of said multiplier and a digit of said multiplicand in a sequence of groups, each group composed of a sequence of digit multiplications which will produce partial products whose digits are in the same ordinal positions of said product, said sequence of said groups being selected so that each of the partial products comprising a group contains a larger order ordinal position than the partial products comprising the next preceding group, means to feed said pulses to said digit's selection means to select a digit of said multiplier and a digit of said multiplicand, digit multiplying means having a left-hand and a right-hand component storage means, means to transfer said selected digits to said multiplying means to multiply said digits and to store the left-hand and right-hand components of said partial product in said left-hand and right-hand component storage means, and means to accumulate said partial products to provide said product.

14. Apparatus as claimed in claim 13 wherein said accumulation means includes an adder, means to transfer a partial product to said adder, an accumulated products storage means, means to transfer the corresponding ordinal digits of said accumulated product to said adder from said accumulated product storage means to provide a sum corresponding to a new accumulated product for said corresponding ordinal positions and means to transfer said sum to said corresponding ordinal positions of said accumulated product in said accumulated product storage means.

15. Apparatus as claimed in claim 14 wherein said digit selection means includes a gating means associated with each digit of said multiplier and multiplicand.

16. In the addition of two multi-digit operands, a carry propagation storage device for selectively providing a first value indicative of a digit with no carry for a first ordinal position one of said operands in a multi-ordinal position number and a second value indicative of said digit increased by said carry for said first ordinal position that comprises a core matrix, means to switch a first core in said matrix indicative of said first value, means to switch a second core in said matrix indicative of said second value and means to select one of said cores as a function of the value of an ordinal position immediately preceding said first ordinal position in said number.

17. Apparatus for adding first and second multi-digit numbers to provide a multi-digit sum that comprises an adder, means to transfer the first ordinal digit of said numbers to said adder to first add said first ordinal position digits, means to selectively indicate a carry and no-carry order as a result of said first addition, means to store a first value indicative of said next higher ordinal digit of one of said numbers, means to store a second value indicative of said next higher ordinal digit of said one of said numbers increased by said carry order, means to select one of said values as a function of the value of said first addition, means to transfer said selected value to said adder, means to transfer the next higher ordinal digit of the other of said numbers to said adder to second add said selected value and said next higher ordinal digit of said other of said numbers and means to selectively indicate a carry and no-carry order as a result of said second addition.

18. Apparatus as claimed in claim 17 wherein said storage means for said first and second values is a core matrix.

19. Apparatus as claimed in claim 17 wherein said adder is a core matrix.

20. Apparatus as claimed in claim 17 wherein said adder core matrix is divided into two sections, one a carry section and the other a no-carry section.

21. In a data processing system; a first storage unit, a second storage unit, a storage register, separate selectively operable read means for each said storage unit for reading information therefrom, separate selectively operable writing means for each storage unit for enabling said each unit to store information transmitted thereto, and common information transmission means connecting said storage register to both said storage units for transmitting information read from either unit to the register and for transmitting information from the register to either unit.

22. In a data processing system; a first magnetic core matrix capable of storing information, a second magnetic core matrix capable of storing information, a data storage register, means for selectively reading information from said first matrix or said second matrix, common sense lines coupling said first and second matrices to said storage register for transferring information from said first matrix to said storage register and from said second matrix to said storage register, data entry drive means coupled to said storage register and energizable in accordance with information stored therein, said data entry drive means including common drive lines coupled to both said first and second matrices for transferring information thereto, and selectively operable means for each of said first and second matrices for causing entry therein of information transferred thereto over the common drive lines.

23. In a data processing system; a first magnetic core matrix capable of storing information, a second magnetic core matrix capable of storing information, a data storage register, means for selectively reading information from said first storage matrix or said second storage matrix, common sense lines coupling said first and second matrices to said storage register for transferring information from said first matrix to said storage register and from said second matrix to said storage register, data entry drive means coupled to said storage register and energizable in accordance with information stored therein, said data entry drive means including common drive lines coupled to both said first and second matrices for transferring information thereto, a second storage register for holding additional information, and second data entry drive means coupled to the second storage register and selectively energizable in accordance with additional information stored therein, said second drive means including drive lines coupled to the second matrix for transferring said additional information thereto.

24. In a data processing system as defined by claim 23 further including selectively operable means for said first matrix causing entry of information transferred over the common drive lines.

25. In a data processing system; a magnetic core storage unit, a magnetic core arithmetic unit, a first data storage register, selectively operable reading means for each of said storage unit and said arithmetic unit for reading data therefrom, common sense lines coupled through the storage unit and the arithmetic unit and connected to the first data storage register for transferring data read from the storage unit or the arithmetic unit to the first storage register, first data entry drive means coupled to said first storage register and energizable in accordance with data stored therein, said first data entry drive means including common drive lines coupled through said matrix arithmetic unit and said storage unit for transferring data to either of said units, selectively operable writing means for said storage unit for causing entry therein of data transmitted over the common drive lines, a second data storage register, second data entry means coupled to said second storage register and selectively energizable in accordance with data stored therein, said second data entry means including drive lines coupled through said arithmetic unit for transferring data thereto from said second register, and said arithmetic unit including means operable upon simultaneous application of data to said arithmetic unit over said common drive lines and said second drive lines for establishing the result of a predetermined arithmetic operation involving the said data.

26. In a data processing system; a magnetic core storage unit, a magnetic core logic unit for performing logical operations on data entered therein, a data storage register, selectively operable reading means for each of said storage unit and said logic unit for reading data therefrom, common sense lines coupled through the storage unit and the logic unit and connected to the first data storage register for transferring data read from the storage unit or the logic unit to the first storage register, first data entry drive means coupled to said first storage register and energizable in accordance with data stored therein, said first data entry drive means including common drive lines coupled through said logic unit and said storage unit for transferring data to either of said units, and selectively operable writing means for each of said storage unit and said logic unit for causing entry therein of data transmitted over the common drive lines.

27. In a data processing system; a magnetic core storage unit, a magnetic core logic unit for performing logical operations upon data entered therein, a first data storage register, selectively operable reading means for each of said storage unit and said logic unit for reading data therefrom, common sense lines coupled through the storage unit and the arithmetic unit and connected to the first data storage register for transferring data read from the storage unit or the logic unit to the first storage register, first data entry drive means coupled to said first storage register and energizable in accordance with data stored therein, said first data entry drive means including common drive lines coupled through said logic unit and said storage unit for transferring data to either of said units, selectively operable writing means for said storage unit for causing entry therein of data transmitted over the common drive lines, a second data storage register, second data entry means coupled to said second storage register and selectively energizable in accordance with data stored therein, said second data entry means including drive lines coupled through said logic unit for transferring data thereto from said second register, and said logic unit including means operable upon simultaneous application of data thereto over said common drive lines and said second drive lines for establishing the result of a predetermined logical operation involving the said data.

(References on following page)

References Cited in the file of this patent

UNITED STATES PATENTS

| | | |
|---|---|---|
| 2,298,353 | Dreher | Oct. 13, 1942 |
| 2,350,499 | Dickinson | June 6, 1944 |
| 2,364,540 | Luhn | Dec. 5, 1944 |
| 2,536,951 | Luhn | Jan. 2, 1951 |
| 2,904,781 | Katz | Sept. 15, 1959 |
| 2,921,737 | Chen | Jan. 19, 1960 |
| 2,954,168 | Maddox | Sept. 27, 1960 |

OTHER REFERENCES

Rajchman: A Myriabit Magnetic-Core Matrix Memory, Proceedings of the I.R.E. (Oct. 1953), pps. 1407–1421.